(12) United States Patent
Sampsell

(10) Patent No.: US 7,702,192 B2
(45) Date of Patent: Apr. 20, 2010

(54) SYSTEMS AND METHODS FOR DRIVING MEMS DISPLAY

(75) Inventor: Jeffrey B. Sampsell, San Jose, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 954 days.

(21) Appl. No.: 11/472,880

(22) Filed: Jun. 21, 2006

(65) Prior Publication Data
US 2007/0296691 A1 Dec. 27, 2007

(51) Int. Cl.
G02B 6/26 (2006.01)
G09G 3/34 (2006.01)
G01N 21/00 (2006.01)

(52) U.S. Cl. .............................. 385/15; 385/1; 385/901; 385/16; 385/17; 385/18; 345/108; 356/73.1

(58) Field of Classification Search .................... 385/14, 385/15, 16, 17, 18, 24, 1, 901; 356/73.1; 345/31, 108
See application file for complete search history.

(56) References Cited

U.S. PATENT DOCUMENTS

| 3,982,239 | A | 9/1976 | Sherr |
|---|---|---|---|
| 4,403,248 | A | 9/1983 | te Velde |
| 4,441,791 | A | 4/1984 | Hornbeck |
| 4,459,182 | A | 7/1984 | te Velde |
| 4,482,213 | A | 11/1984 | Piliavin et al. |
| 4,500,171 | A | 2/1985 | Penz et al. |
| 4,519,676 | A | 5/1985 | te Velde |
| 4,566,935 | A | 1/1986 | Hornbeck |
| 4,571,603 | A | 2/1986 | Hornbeck et al. |
| 4,596,992 | A | 6/1986 | Hornbeck |
| 4,615,595 | A | 10/1986 | Hornbeck |
| 4,662,746 | A | 5/1987 | Hornbeck |
| 4,681,403 | A | 7/1987 | te Velde et al. |
| 4,709,995 | A | 12/1987 | Kuribayashi et al. |
| 4,710,732 | A | 12/1987 | Hornbeck |
| 4,856,863 | A | 8/1989 | Sampsell et al. |
| 4,859,060 | A | 8/1989 | Katagiri et al. |

(Continued)

FOREIGN PATENT DOCUMENTS

EP 0295802 A 12/1988

(Continued)

OTHER PUBLICATIONS

Miles et al., 5.3: Digital PaperTM: Reflective displays using interferometric modulation, SID Digest, vol. XXXI, 2000 pp. 32-35.

(Continued)

*Primary Examiner*—Brian M Healy
(74) *Attorney, Agent, or Firm*—Knobbe Martens Olson & Bear LLP

(57) ABSTRACT

Systems and methods for driving a display of MEMS devices are disclosed. In one embodiment, a display device comprises an array of MEMS display elements, at least one test deflecting element, and a deflection sensing circuit connected to the test deflecting element, the deflection sensing circuit being configured to monitor deflection of the test deflecting element without actuating the test deflection element and to provide a signal indicative of one or more parameters affecting operation of the array of MEMS display elements based on the deflection.

59 Claims, 12 Drawing Sheets

1410 — APPLY A VOLTAGE ACROSS ONE OR MORE TEST DEFLECTING ELEMENTS, WHEREIN THE VOLTAGE IS CHOSEN SUCH THAT THE ONE OR MORE TEST DEFLECTING ELEMENTS STAYS UNACTUATED

1420 — MEASURE A TEMPERATURE DEPENDENT DEFLECTION OF THE ONE OR MORE TEST DEFLECTING ELEMENTS

1430 — PROVIDE DRIVING SIGNALS TO AN ARRAY OF INTERFEROMETRIC MODULATORS BASED AT LEAST IN PART ON THE DEFLECTION MEASUREMENT

U.S. PATENT DOCUMENTS

| | | |
|---|---|---|
| 4,954,789 A | 9/1990 | Sampsell |
| 4,956,619 A | 9/1990 | Hornbeck |
| 4,982,184 A | 1/1991 | Kirkwood |
| 5,018,256 A | 5/1991 | Hornbeck |
| 5,028,939 A | 7/1991 | Hornbeck et al. |
| 5,037,173 A | 8/1991 | Sampsell et al. |
| 5,055,833 A | 10/1991 | Hehlen et al. |
| 5,061,049 A | 10/1991 | Hornbeck |
| 5,078,479 A | 1/1992 | Vuilleumier |
| 5,079,544 A | 1/1992 | DeMond et al. |
| 5,083,857 A | 1/1992 | Hornbeck |
| 5,096,279 A | 3/1992 | Hornbeck et al. |
| 5,099,353 A | 3/1992 | Hornbeck |
| 5,124,834 A | 6/1992 | Cusano et al. |
| 5,142,405 A | 8/1992 | Hornbeck |
| 5,142,414 A | 8/1992 | Koehler et al. |
| 5,162,787 A | 11/1992 | Thompson et al. |
| 5,168,406 A | 12/1992 | Nelson |
| 5,170,156 A | 12/1992 | DeMond et al. |
| 5,172,262 A | 12/1992 | Hornbeck |
| 5,179,274 A | 1/1993 | Sampsell |
| 5,192,395 A | 3/1993 | Boysel et al. |
| 5,192,946 A | 3/1993 | Thompson et al. |
| 5,206,629 A | 4/1993 | DeMond et al. |
| 5,212,582 A | 5/1993 | Nelson |
| 5,214,419 A | 5/1993 | DeMond et al. |
| 5,214,420 A | 5/1993 | Thompson et al. |
| 5,216,537 A | 6/1993 | Hornbeck |
| 5,226,099 A | 7/1993 | Mignardi et al. |
| 5,227,900 A | 7/1993 | Inaba et al. |
| 5,231,532 A | 7/1993 | Magel et al. |
| 5,233,385 A | 8/1993 | Sampsell |
| 5,233,456 A | 8/1993 | Nelson |
| 5,233,459 A | 8/1993 | Bozler et al. |
| 5,254,980 A | 10/1993 | Hendrix et al. |
| 5,272,473 A | 12/1993 | Thompson et al. |
| 5,278,652 A | 1/1994 | Urbanus et al. |
| 5,280,277 A | 1/1994 | Hornbeck |
| 5,287,096 A | 2/1994 | Thompson et al. |
| 5,287,215 A | 2/1994 | Warde et al. |
| 5,296,950 A | 3/1994 | Lin et al. |
| 5,305,640 A | 4/1994 | Boysel et al. |
| 5,312,513 A | 5/1994 | Florence et al. |
| 5,323,002 A | 6/1994 | Sampsell et al. |
| 5,325,116 A | 6/1994 | Sampsell |
| 5,327,286 A | 7/1994 | Sampsell et al. |
| 5,331,454 A | 7/1994 | Hornbeck |
| 5,339,116 A | 8/1994 | Urbanus et al. |
| 5,365,283 A | 11/1994 | Doherty et al. |
| 5,411,769 A | 5/1995 | Hornbeck |
| 5,444,566 A | 8/1995 | Gale et al. |
| 5,446,479 A | 8/1995 | Thompson et al. |
| 5,448,314 A | 9/1995 | Heimbuch et al. |
| 5,452,024 A | 9/1995 | Sampsell |
| 5,454,906 A | 10/1995 | Baker et al. |
| 5,457,493 A | 10/1995 | Leddy et al. |
| 5,457,566 A | 10/1995 | Sampsell et al. |
| 5,459,602 A | 10/1995 | Sampsell |
| 5,461,411 A | 10/1995 | Florence et al. |
| 5,488,505 A | 1/1996 | Engle |
| 5,489,952 A | 2/1996 | Gove et al. |
| 5,497,172 A | 3/1996 | Doherty et al. |
| 5,497,197 A | 3/1996 | Gove et al. |
| 5,499,062 A | 3/1996 | Urbanus |
| 5,506,597 A | 4/1996 | Thompson et al. |
| 5,515,076 A | 5/1996 | Thompson et al. |
| 5,517,347 A | 5/1996 | Sampsell |
| 5,523,803 A | 6/1996 | Urbanus et al. |
| 5,526,051 A | 6/1996 | Gove et al. |
| 5,526,172 A | 6/1996 | Kanack |
| 5,526,688 A | 6/1996 | Boysel et al. |
| 5,535,047 A | 7/1996 | Hornbeck |
| 5,548,301 A | 8/1996 | Kornher et al. |
| 5,551,293 A | 9/1996 | Boysel et al. |
| 5,552,924 A | 9/1996 | Tregilgas |
| 5,552,925 A | 9/1996 | Worley |
| 5,563,398 A | 10/1996 | Sampsell |
| 5,567,334 A | 10/1996 | Baker et al. |
| 5,570,135 A | 10/1996 | Gove et al. |
| 5,578,976 A | 11/1996 | Yao |
| 5,581,272 A | 12/1996 | Conner et al. |
| 5,583,688 A | 12/1996 | Hornbeck |
| 5,589,852 A | 12/1996 | Thompson et al. |
| 5,597,736 A | 1/1997 | Sampsell |
| 5,598,565 A | 1/1997 | Reinhardt |
| 5,600,383 A | 2/1997 | Hornbeck |
| 5,602,671 A | 2/1997 | Hornbeck |
| 5,606,441 A | 2/1997 | Florence et al. |
| 5,608,468 A | 3/1997 | Gove et al. |
| 5,610,438 A | 3/1997 | Wallace et al. |
| 5,610,624 A | 3/1997 | Bhuva |
| 5,610,625 A | 3/1997 | Sampsell |
| 5,612,713 A | 3/1997 | Bhuva et al. |
| 5,619,061 A | 4/1997 | Goldsmith et al. |
| 5,619,365 A | 4/1997 | Rhoades et al. |
| 5,619,366 A | 4/1997 | Rhoads et al. |
| 5,629,790 A | 5/1997 | Neukermans et al. |
| 5,633,652 A | 5/1997 | Kanbe et al. |
| 5,636,052 A | 6/1997 | Arney et al. |
| 5,638,084 A | 6/1997 | Kalt |
| 5,638,946 A | 6/1997 | Zavracky et al. |
| 5,646,768 A | 7/1997 | Kaeriyama |
| 5,650,834 A | 7/1997 | Nakagawa et al. |
| 5,650,881 A | 7/1997 | Hornbeck |
| 5,654,741 A | 8/1997 | Sampsell et al. |
| 5,657,099 A | 8/1997 | Doherty et al. |
| 5,659,374 A | 8/1997 | Gale, Jr. et al. |
| 5,665,997 A | 9/1997 | Weaver et al. |
| 5,745,193 A | 4/1998 | Urbanus et al. |
| 5,745,281 A | 4/1998 | Yi et al. |
| 5,754,160 A | 5/1998 | Shimizu et al. |
| 5,771,116 A | 6/1998 | Miller et al. |
| 5,784,189 A | 7/1998 | Bozler et al. |
| 5,784,212 A | 7/1998 | Hornbeck |
| 5,808,780 A | 9/1998 | McDonald |
| 5,818,095 A | 10/1998 | Sampsell |
| 5,835,255 A | 11/1998 | Miles |
| 5,842,088 A | 11/1998 | Thompson |
| 5,867,302 A | 2/1999 | Fleming et al. |
| 5,912,758 A | 6/1999 | Knipe et al. |
| 5,943,158 A | 8/1999 | Ford et al. |
| 5,959,763 A | 9/1999 | Bozler et al. |
| 5,966,235 A | 10/1999 | Walker et al. |
| 5,986,796 A | 11/1999 | Miles |
| 6,028,690 A | 2/2000 | Carter et al. |
| 6,038,056 A | 3/2000 | Florence et al. |
| 6,040,937 A | 3/2000 | Miles |
| 6,049,317 A | 4/2000 | Thompson et al. |
| 6,055,090 A | 4/2000 | Miles |
| 6,057,903 A | 5/2000 | Colgan et al. |
| 6,061,075 A | 5/2000 | Nelson et al. |
| 6,099,132 A | 8/2000 | Kaeriyama |
| 6,100,872 A | 8/2000 | Aratani et al. |
| 6,113,239 A | 9/2000 | Sampsell et al. |
| 6,147,790 A | 11/2000 | Meier et al. |
| 6,160,833 A | 12/2000 | Floyd et al. |
| 6,180,428 B1 | 1/2001 | Peeters et al. |
| 6,201,633 B1 | 3/2001 | Peeters et al. |
| 6,232,936 B1 | 5/2001 | Gove et al. |
| 6,246,398 B1 | 6/2001 | Koo |
| 6,275,326 B1 | 8/2001 | Bhalla et al. |
| 6,282,010 B1 | 8/2001 | Sulzbach et al. |
| 6,295,154 B1 | 9/2001 | Laor et al. |
| 6,304,297 B1 | 10/2001 | Swan |

| | | |
|---|---|---|
| 6,323,982 B1 | 11/2001 | Hornbeck |
| 6,327,071 B1 | 12/2001 | Kimura |
| 6,356,085 B1 | 3/2002 | Ryat et al. |
| 6,356,254 B1 | 3/2002 | Kimura |
| 6,381,022 B1 | 4/2002 | Zavracky |
| 6,429,601 B1 | 8/2002 | Friend et al. |
| 6,433,917 B1 | 8/2002 | Mei et al. |
| 6,447,126 B1 | 9/2002 | Hornbeck |
| 6,465,355 B1 | 10/2002 | Horsley |
| 6,466,358 B2 | 10/2002 | Tew |
| 6,473,274 B1 | 10/2002 | Maimone et al. |
| 6,480,177 B2 | 11/2002 | Doherty et al. |
| 6,480,645 B1* | 11/2002 | Peale et al. .................. 385/18 |
| 6,483,456 B2 | 11/2002 | Huisken |
| 6,496,122 B2 | 12/2002 | Sampsell |
| 6,501,107 B1 | 12/2002 | Sinclair et al. |
| 6,507,330 B1 | 1/2003 | Handschy et al. |
| 6,507,331 B1 | 1/2003 | Schlangen et al. |
| 6,545,335 B1 | 4/2003 | Chua et al. |
| 6,548,908 B2 | 4/2003 | Chua et al. |
| 6,549,338 B1 | 4/2003 | Wolverton et al. |
| 6,552,840 B2 | 4/2003 | Knipe |
| 6,574,033 B1 | 6/2003 | Chui et al. |
| 6,589,625 B1 | 7/2003 | Kothari et al. |
| 6,593,934 B1 | 7/2003 | Liaw et al. |
| 6,600,201 B2 | 7/2003 | Hartwell et al. |
| 6,606,175 B1 | 8/2003 | Sampsell et al. |
| 6,625,047 B2 | 9/2003 | Coleman, Jr. |
| 6,630,786 B2 | 10/2003 | Cummings et al. |
| 6,632,698 B2 | 10/2003 | Ives |
| 6,633,306 B1 | 10/2003 | März et al. |
| 6,643,069 B2 | 11/2003 | Dewald |
| 6,650,455 B2 | 11/2003 | Miles |
| 6,666,561 B1* | 12/2003 | Blakley .................. 359/877 |
| 6,674,090 B1 | 1/2004 | Chua et al. |
| 6,674,562 B1 | 1/2004 | Miles |
| 6,680,792 B2 | 1/2004 | Miles |
| 6,710,908 B2 | 3/2004 | Miles et al. |
| 6,741,377 B2 | 5/2004 | Miles |
| 6,741,384 B1 | 5/2004 | Martin et al. |
| 6,741,503 B1 | 5/2004 | Farris et al. |
| 6,747,785 B2 | 6/2004 | Chen et al. |
| 6,762,873 B1 | 7/2004 | Coker et al. |
| 6,775,174 B2 | 8/2004 | Huffman et al. |
| 6,778,155 B2 | 8/2004 | Doherty et al. |
| 6,781,643 B1 | 8/2004 | Watanabe et al. |
| 6,787,384 B2 | 9/2004 | Okumura |
| 6,787,438 B1 | 9/2004 | Nelson |
| 6,788,520 B1* | 9/2004 | Behin et al. .................. 361/207 |
| 6,794,119 B2 | 9/2004 | Miles |
| 6,811,267 B1 | 11/2004 | Allen et al. |
| 6,813,060 B1 | 11/2004 | Garcia et al. |
| 6,819,469 B1 | 11/2004 | Koba |
| 6,822,628 B2 | 11/2004 | Dunphy et al. |
| 6,829,132 B2 | 12/2004 | Martin et al. |
| 6,843,576 B2* | 1/2005 | Blakley .................. 359/877 |
| 6,853,129 B1 | 2/2005 | Cummings et al. |
| 6,855,610 B2 | 2/2005 | Tung et al. |
| 6,859,218 B1 | 2/2005 | Luman et al. |
| 6,861,277 B1 | 3/2005 | Monroe et al. |
| 6,862,022 B2 | 3/2005 | Slupe |
| 6,862,029 B1 | 3/2005 | D'Souza et al. |
| 6,867,896 B2 | 3/2005 | Miles |
| 6,870,581 B2 | 3/2005 | Li et al. |
| 6,903,860 B2 | 6/2005 | Ishii |
| 7,034,783 B2 | 4/2006 | Gates et al. |
| 7,123,216 B1 | 10/2006 | Miles |
| 7,126,741 B2 | 10/2006 | Wagner et al. .................. 359/290 |
| 7,161,728 B2 | 1/2007 | Sampsell et al. |
| 2001/0034075 A1 | 10/2001 | Onoya |
| 2001/0046081 A1 | 11/2001 | Hayashi et al. |
| 2001/0051014 A1 | 12/2001 | Behin et al. |
| 2002/0000959 A1 | 1/2002 | Colgan et al. |
| 2002/0005827 A1 | 1/2002 | Kobayashi |
| 2002/0010763 A1 | 1/2002 | Salo et al. |
| 2002/0012159 A1 | 1/2002 | Tew |
| 2002/0015215 A1 | 2/2002 | Miles |
| 2002/0024711 A1 | 2/2002 | Miles |
| 2002/0036304 A1 | 3/2002 | Ehmke et al. |
| 2002/0050882 A1 | 5/2002 | Hyman et al. |
| 2002/0054424 A1 | 5/2002 | Miles et al. |
| 2002/0075226 A1 | 6/2002 | Lippincott |
| 2002/0075555 A1 | 6/2002 | Miles |
| 2002/0093722 A1 | 7/2002 | Chan et al. |
| 2002/0097133 A1 | 7/2002 | Charvet et al. |
| 2002/0126354 A1 | 9/2002 | Jeong et al. |
| 2002/0126364 A1 | 9/2002 | Miles |
| 2002/0179421 A1 | 12/2002 | Williams et al. |
| 2002/0186108 A1 | 12/2002 | Hallbjorner |
| 2003/0004272 A1 | 1/2003 | Power |
| 2003/0020699 A1 | 1/2003 | Nakatani et al. |
| 2003/0043157 A1 | 3/2003 | Miles |
| 2003/0072070 A1 | 4/2003 | Miles |
| 2003/0122773 A1 | 7/2003 | Washio et al. |
| 2003/0137215 A1 | 7/2003 | Cabuz |
| 2003/0137521 A1 | 7/2003 | Zehner et al. |
| 2003/0189536 A1 | 10/2003 | Ruigt |
| 2003/0202264 A1 | 10/2003 | Weber et al. |
| 2003/0202265 A1 | 10/2003 | Reboa et al. |
| 2003/0202266 A1 | 10/2003 | Ring et al. |
| 2004/0008396 A1 | 1/2004 | Stappaerts |
| 2004/0022044 A1 | 2/2004 | Yasuoka et al. |
| 2004/0027701 A1 | 2/2004 | Ishikawa |
| 2004/0051929 A1 | 3/2004 | Sampsell et al. |
| 2004/0058532 A1 | 3/2004 | Miles et al. |
| 2004/0080807 A1 | 4/2004 | Chen et al. |
| 2004/0145049 A1 | 7/2004 | McKinnell et al. |
| 2004/0147056 A1 | 7/2004 | McKinnell et al. |
| 2004/0160143 A1 | 8/2004 | Shreeve et al. |
| 2004/0174583 A1 | 9/2004 | Chen et al. |
| 2004/0179281 A1 | 9/2004 | Reboa |
| 2004/0212026 A1 | 10/2004 | Van Brocklin et al. |
| 2004/0217378 A1 | 11/2004 | Martin et al. |
| 2004/0217919 A1 | 11/2004 | Pichl et al. |
| 2004/0218251 A1 | 11/2004 | Piehl et al. |
| 2004/0218334 A1 | 11/2004 | Martin et al. |
| 2004/0218341 A1 | 11/2004 | Martin et al. |
| 2004/0223204 A1 | 11/2004 | Mao et al. |
| 2004/0227493 A1 | 11/2004 | Van Brocklin et al. |
| 2004/0240032 A1 | 12/2004 | Miles |
| 2004/0240138 A1 | 12/2004 | Martin et al. |
| 2004/0245588 A1 | 12/2004 | Nikkel et al. |
| 2004/0263944 A1 | 12/2004 | Miles et al. |
| 2005/0001828 A1 | 1/2005 | Martin et al. |
| 2005/0012577 A1 | 1/2005 | Pillans et al. |
| 2005/0038950 A1 | 2/2005 | Adelmann |
| 2005/0057442 A1 | 3/2005 | Way |
| 2005/0068583 A1 | 3/2005 | Gutkowski et al. |
| 2005/0069209 A1 | 3/2005 | Damera-Venkata et al. |
| 2005/0116924 A1 | 6/2005 | Sauvante et al. |
| 2005/0152015 A1 | 7/2005 | Anderson et al. |
| 2005/0179912 A1 | 8/2005 | Van Brocklin et al. |
| 2006/0066553 A1 | 3/2006 | Deane .................. 345/98 |
| 2006/0066935 A1 | 3/2006 | Cummings et al. |
| 2006/0067653 A1 | 3/2006 | Gally et al. |
| 2006/0077513 A1 | 4/2006 | Gan et al. |
| 2007/0053652 A1 | 3/2007 | Mignard et al. |
| 2007/0296691 A1* | 12/2007 | Sampsell .................. 345/108 |

FOREIGN PATENT DOCUMENTS

| | | |
|---|---|---|
| EP | 0300754 A2 | 1/1989 |
| EP | 0306308 A2 | 3/1989 |
| EP | 0318050 A | 5/1989 |
| EP | 0417523 A | 3/1991 |
| EP | 0467048 A | 1/1992 |

| | | | |
|---|---|---|---|
| EP | 0570906 A | 11/1993 |
| EP | 0608056 A1 | 7/1994 |
| EP | 0655725 A1 | 5/1995 |
| EP | 0667548 A1 | 8/1995 |
| EP | 0725380 A1 | 8/1996 |
| EP | 0852371 A1 | 7/1998 |
| EP | 0911794 A1 | 4/1999 |
| EP | 1017038 A | 7/2000 |
| EP | 1039311 A1 | 9/2000 |
| EP | 1146533 A | 10/2001 |
| EP | 02062493 | 2/2002 |
| EP | 1258860 A1 | 11/2002 |
| EP | 1343190 A | 9/2003 |
| EP | 1345197 A | 9/2003 |
| EP | 1381023 A | 1/2004 |
| EP | 1473691 A2 | 11/2004 |
| EP | 1 630 781 | 3/2006 |
| GB | 2401200 A | 11/2004 |
| JP | 2002-175053 | 6/2002 |
| JP | 2004-29571 | 1/2004 |
| JP | 2004004553 | 8/2004 |
| WO | WO 95/30924 | 11/1995 |
| WO | WO 97/17628 | 5/1997 |
| WO | WO 99/52006 A3 | 10/1999 |
| WO | WO 01/08441 A1 | 2/2001 |
| WO | WO 01/73937 A | 10/2001 |
| WO | WO 02/086582 | 10/2002 |
| WO | WO 03/007049 A1 | 1/2003 |
| WO | WO 03/015071 A2 | 2/2003 |
| WO | WO 03/044765 A2 | 5/2003 |
| WO | WO 03/060940 A | 7/2003 |
| WO | WO 03/069413 A1 | 8/2003 |
| WO | WO 03/073151 A1 | 9/2003 |
| WO | WO 03/079323 A | 9/2003 |
| WO | WO 03/090199 A1 | 10/2003 |
| WO | WO 2004/006003 A1 | 1/2004 |
| WO | WO 2004/026757 A2 | 4/2004 |
| WO | WO 2004/049034 A1 | 6/2004 |
| WO | WO 2006/036844 A2 | 4/2006 |
| WO | WO 2007/027320 | 3/2007 |

OTHER PUBLICATIONS

ISR and WO for PCT/US07/013886, filed Jun. 12, 2007.
IPRP for PCT/US07/013886, filed Jun. 12, 2007.
Bains, Digital paper display technology holds promise for portables, CommsDesign EE Times (2000).
Lieberman, MEMS display looks to give PDAs sharper image, EE Times (2004).
Lieberman, Microbridges at heart of new MEMS displays, EE Times (2004).
Miles, Interferometric modulation: MOEMS as an enabling technology for high-performance reflective displays, Proceedings of SPIE, vol. 4985, pp. 131-139 (2003).
Miles, MEMS-based interferometric modulator for display applications, Part of the SPIE Conference on Micromachined Devices and Components, vol. 3876, pp. 20-28 (1999).
Miles et al., 10.1: Digital Paper™ for reflective displays, SID 02 Digest, pp. 115-117 (2002).
Peroulis et al., Low contact resistance series MEMS switches, 2002, pp. 223-226, vol. 1, IEEE MTT-S International Microwave Symposium Digest, New York, NY.
Seeger et al., Stabilization of electrostatically actuated mechanical devices, (1997) International Conference on Solid State Sensors and Actuators; vol. 2, pp. 1133-1136.

* cited by examiner

|  | Column Output Signals | |
|---|---|---|
|  | $+V_{bias}$ | $-V_{bias}$ |
| Row Output Signals   0 | Stable | Stable |
| $+\Delta V$ | Relax | Actuate |
| $-\Delta V$ | Actuate | Relax |

SYSTEMS AND METHODS FOR DRIVING MEMS DISPLAY

BACKGROUND OF THE INVENTION

1. Field of the Invention

The field of the invention relates to microelectromechanical systems (MEMS).

2. Description of the Related Technology

Microelectromechanical systems (MEMS) include micromechanical elements, actuators, and electronics. Micromechanical elements may be created using deposition, etching, and/or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY OF CERTAIN EMBODIMENTS

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Certain Embodiments" one will understand how the features of this invention provide advantages over other display devices.

In one embodiment, a display device comprises an array of MEMS display elements, at least one test deflecting element, and a deflection sensing circuit connected to the test deflecting element, the deflection sensing circuit being configured to monitor deflection of the test deflecting element without actuating the test deflection element and to provide a signal indicative of one or more parameters affecting operation of the array of MEMS display elements based on the deflection.

In another embodiment, a display device comprises an array of MEMS display elements, an array of test deflecting elements formed on a substrate, each test deflecting element being connected in parallel, and a deflection sensing circuit connected to the array of test deflecting elements, the deflection sensing circuit being configured to monitor capacitance of the array of test deflecting elements and to provide a signal indicative of one or more parameters affecting operation of the array of MEMS display elements based on the capacitance.

In another embodiment, a method of driving an array of interferometric modulators comprises applying a voltage across one or more test deflecting elements, wherein the voltage is chosen such that the one or more test deflecting elements stays unactuated; measuring a deflection of the one or more test deflecting elements; and providing driving signals to an array of interferometric modulators based at least in part on the deflection measurement.

In another embodiment, a method of driving an array of interferometric modulators comprises applying a variable voltage across one or more test deflecting elements, the variable voltage comprising a DC component; adjusting the voltage of the DC component to a value such that deflection of the one or more test deflecting elements is substantially the same as a reference value, wherein the one or more test deflecting elements stays unactuated; and providing driving signals to an array of interferometric modulators based at least in part on the value.

In another embodiment, a display device comprises means for displaying image data, means for providing a signal indicative of one or more parameters affecting operation of the display means, and means for driving the displaying means based on the signal.

DETAILED DESCRIPTION OF CERTAIN EMBODIMENTS OF THE INVENTION

The following detailed description is directed to certain specific embodiments of the invention. However, the invention can be embodied in a multitude of different ways. In this description, reference is made to the drawings wherein like parts are designated with like numerals throughout. As will be apparent from the following description, the embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

Figure 1:
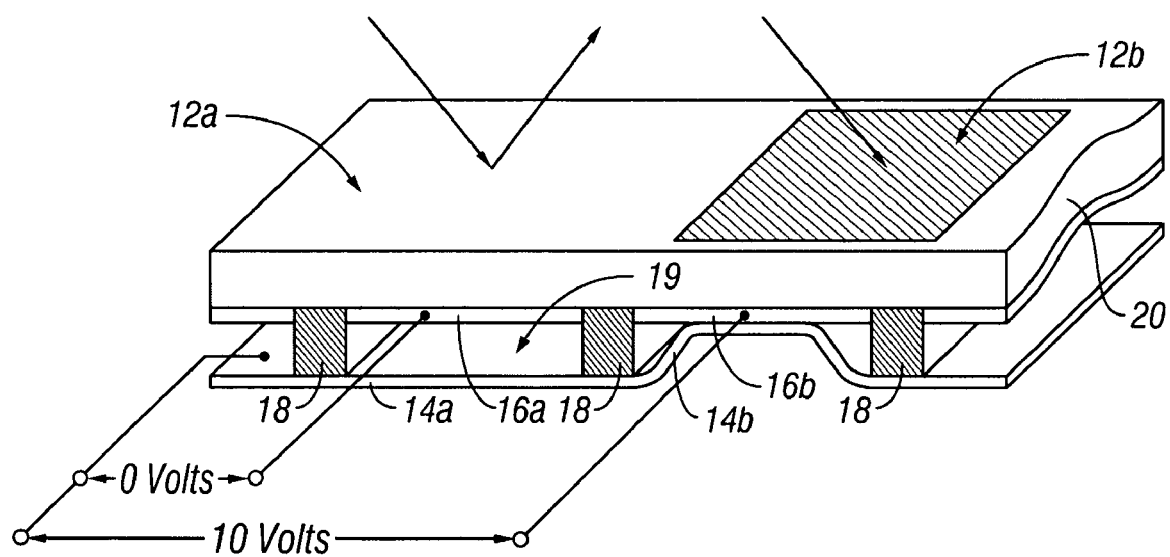
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical gap with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, typically comprise several fused layers, which can include an electrode layer, such as indium tin oxide (ITO), a partially reflective layer, such as chromium, and a transparent dielectric. The optical stack 16 is thus electrically conductive, partially transparent, and partially reflective, and may be fabricated, for example, by depositing one or more of the above layers onto a transparent substrate 20. The partially reflective layer can be formed from a variety of materials that are partially reflective such as various metals, semiconductors, and dielectrics. The partially reflective layer can be formed of one or more layers of materials, and each of the layers can be formed of a single material or a combination of materials.

In some embodiments, the layers of the optical stack 16 are patterned into parallel strips, and may form row electrodes in a display device as described further below. The movable reflective layers 14a, 14b may be formed as a series of parallel strips of a deposited metal layer or layers (orthogonal to the row electrodes of 16a, 16b) deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material such as aluminum may be used for the reflective layers 14, and these strips may form column electrodes in a display device.

With no applied voltage, the gap 19 remains between the movable reflective layer 14a and optical stack 16a, with the movable reflective layer 14a in a mechanically relaxed state, as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this Figure) within the optical stack 16 may prevent shorting and control the separation distance between layers 14 and 16, as illustrated by pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

FIGS. 2 through 5B illustrate one exemplary process and system for using an array of interferometric modulators in a display application.

Figure 2:
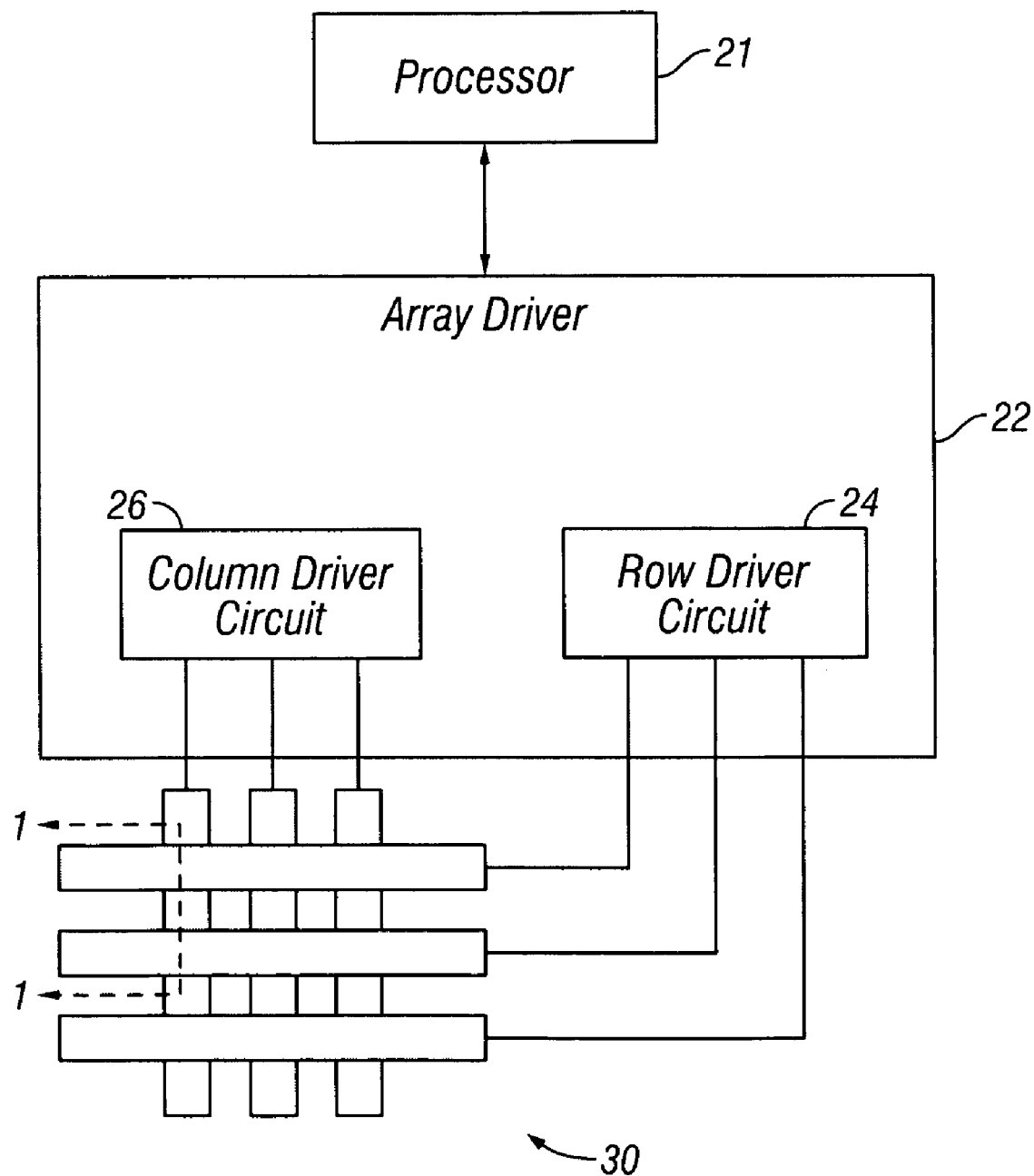
FIG. 2 is a system block diagram illustrating one embodiment of an electronic device incorporating a 3×3 interferometric modulator display.

FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a display array or panel 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. Thus, there exists a window of applied voltage, about 3 to 7 V in the example illustrated in FIG. 3, within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
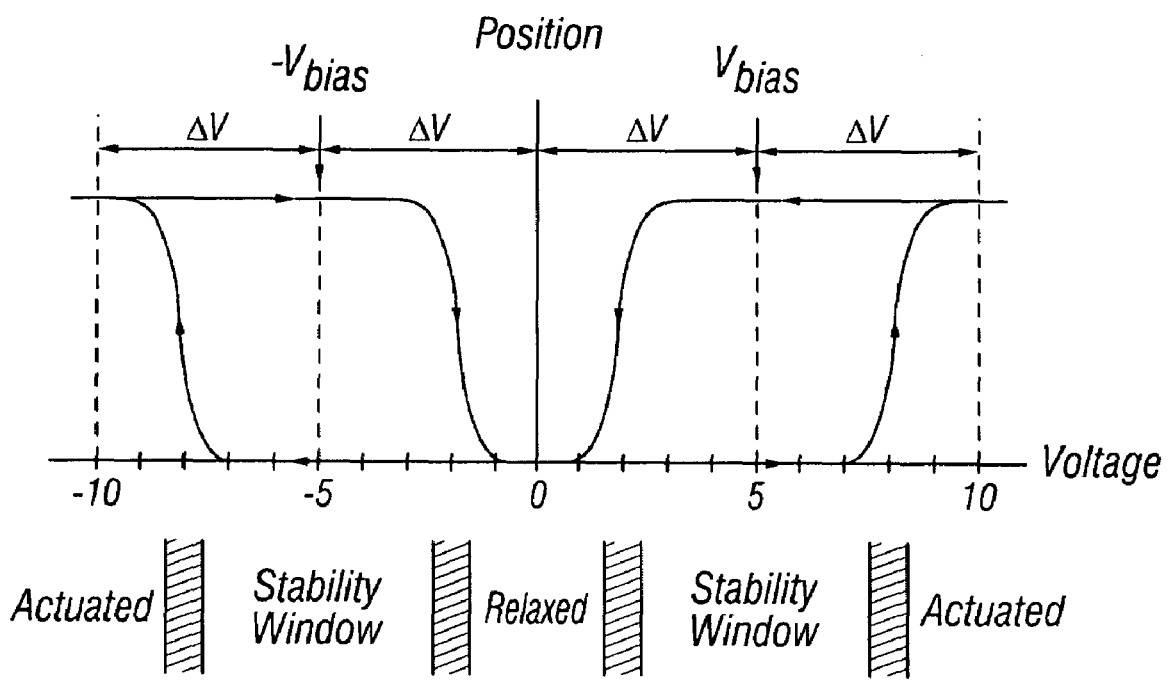
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.
Figure 5A:
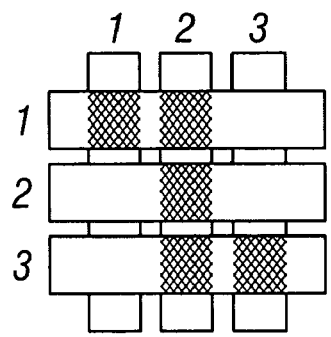
FIG. 5A illustrates one exemplary frame of display data in the 3×3 interferometric modulator display of FIG. 2.
Figure 5B:
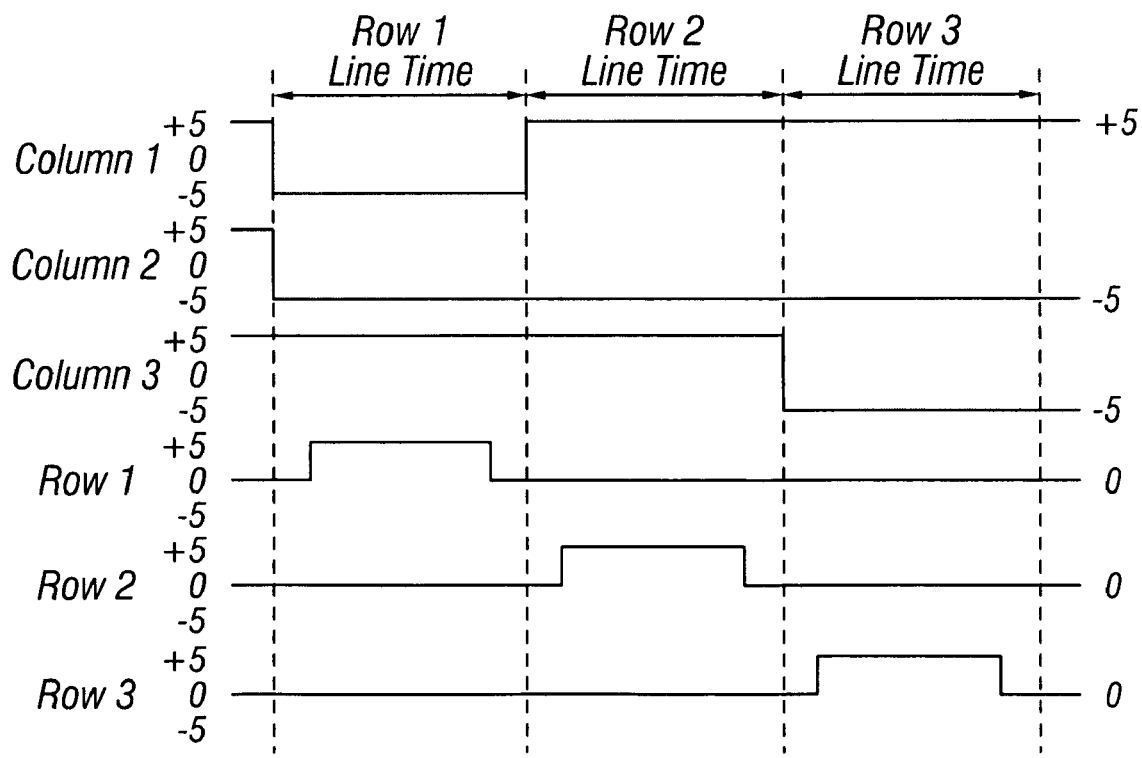
FIG. 5B illustrates one exemplary timing diagram for row and column signals that may be used to write the frame of FIG. 5A.

FIGS. 4, 5A, and 5B illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts, respectively Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, it will be appreciated that voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the systems and methods described herein.

Figure 6A:
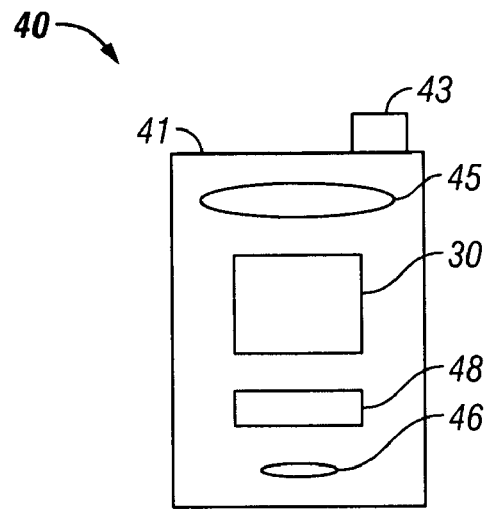
FIGS. 6A and 6B are system block diagrams illustrating an embodiment of a visual display device comprising a plurality of interferometric modulators.
Figure 6B:
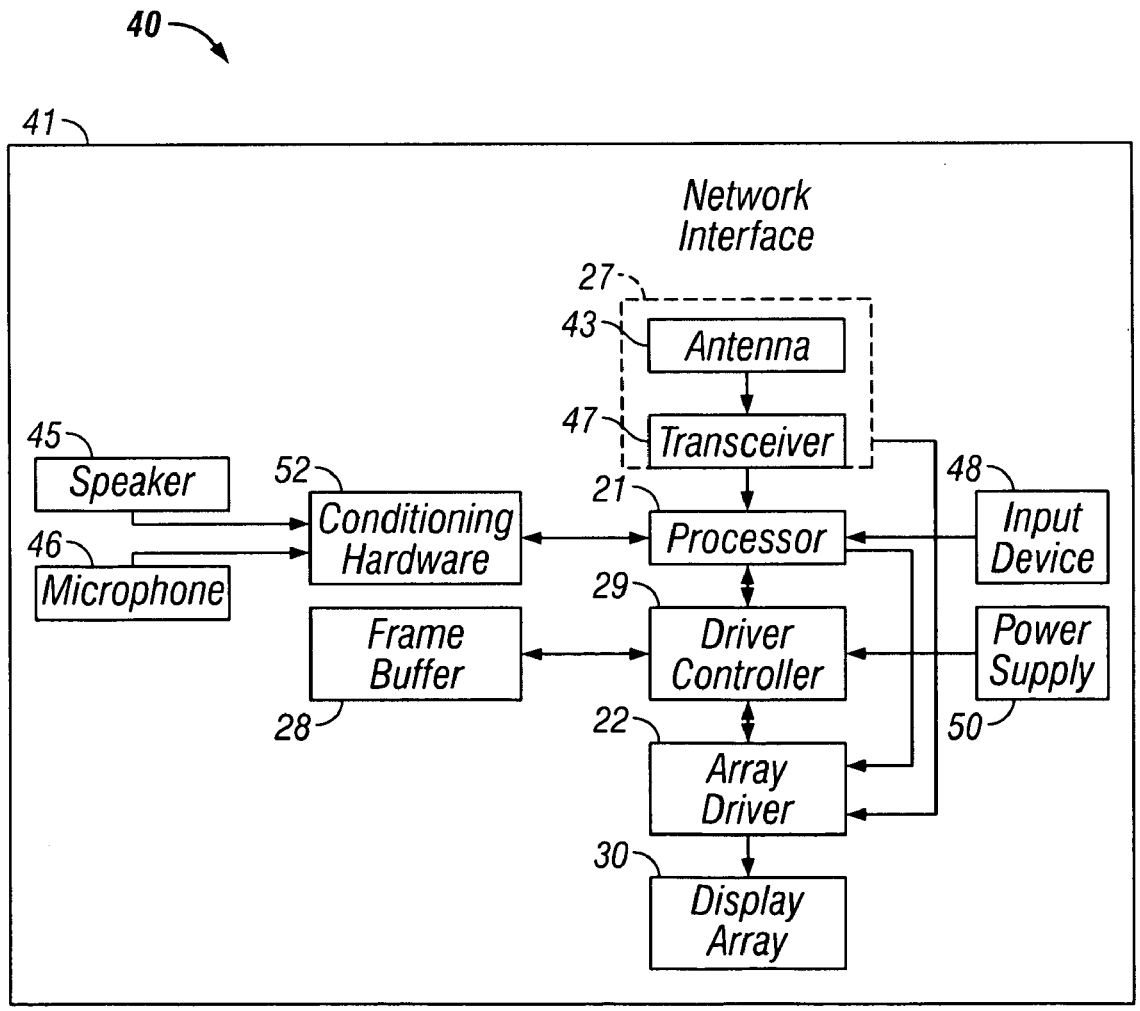

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 45, an input device 48, and a microphone 46. The housing 41 is generally formed from any of a variety of manufacturing processes as are well known to those of skill in the art, including injection molding and vacuum forming. In addition, the housing 41 may be made from any of a variety of materials, including, but not limited to, plastic, metal, glass, rubber, and ceramic, or a combination thereof. In one embodiment, the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device, as is well known to those of skill in the art. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43, which is coupled to a transceiver 47. The transceiver 47 is connected to a processor 21, which is connected to conditioning hardware 52. The conditioning hardware 52 may be configured to condition a signal (e.g., filter a signal). The conditioning hardware 52 is connected to a speaker 45 and a microphone 46. The processor 21 is also connected to an input device 48 and a driver controller 29. The driver controller 29 is coupled to a frame buffer 28 and to an array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one or more devices over a network. In one embodiment, the network interface 27 may also have some processing capabilities to relieve requirements of the processor 21. The antenna 43 is any antenna known to those of skill in the art for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUETOOTH standard. In the case of a cellular telephone, the antenna is designed to receive CDMA, GSM, AMPS, or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 45, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, or a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell including a plastic solar cell, and solar-cell paint. In another embodiment, power supply 50 is configured to receive power from a wall outlet.

In some embodiments, control programmability resides, as described above, in a driver controller which can be located in several places in the electronic display system. In some embodiments, control programmability resides in the array driver 22. Those of skill in the art will recognize that the above-described optimizations may be implemented in any number of hardware and/or software components and in various configurations.

Figure 7A:
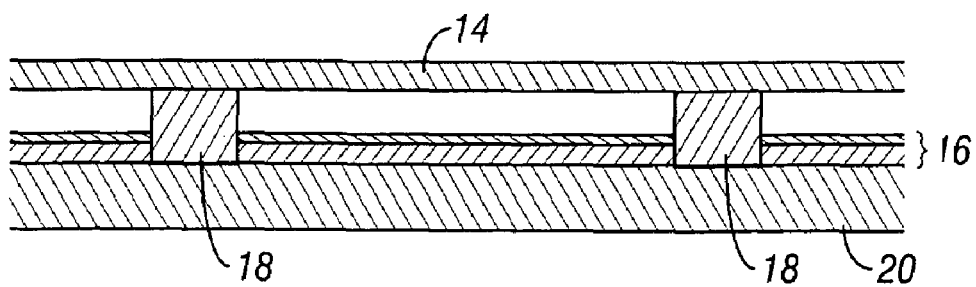
FIG. 7A is a cross section of the device of FIG. 1.
Figure 7B:
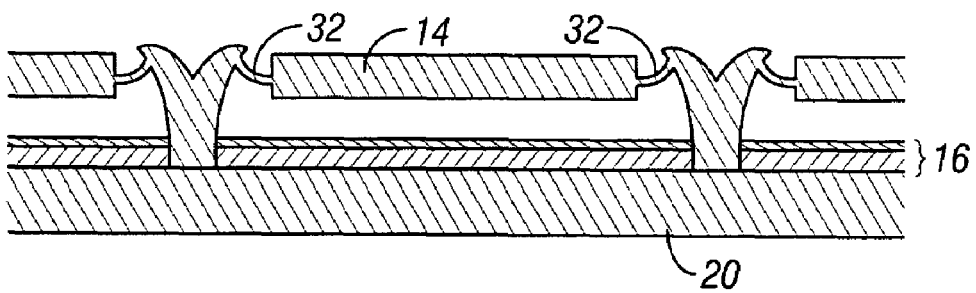
FIG. 7B is a cross section of an alternative embodiment of an interferometric modulator.
Figure 7C:
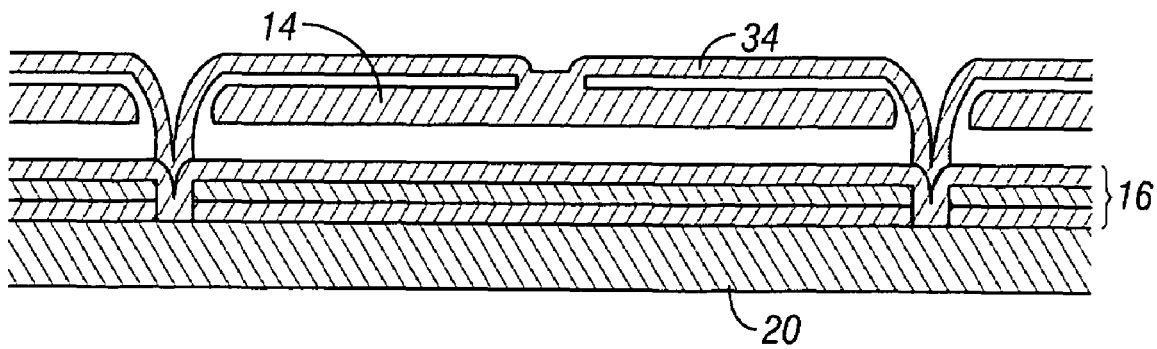
FIG. 7C is a cross section of another alternative embodiment of an interferometric modulator.
Figure 7D:
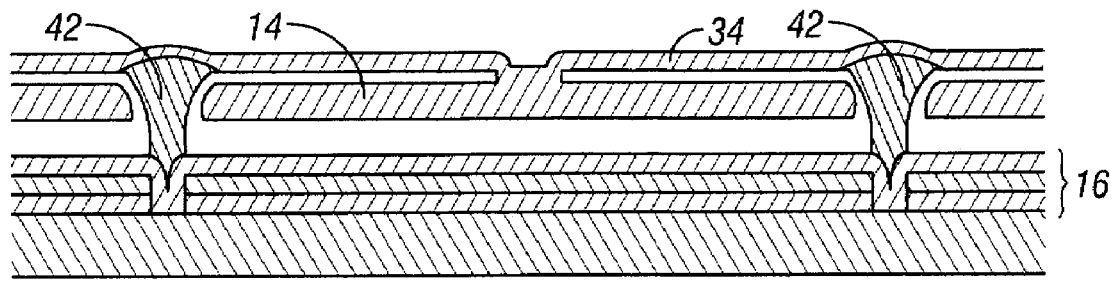
FIG. 7D is a cross section of yet another alternative embodiment of an interferometric modulator.
Figure 7E:
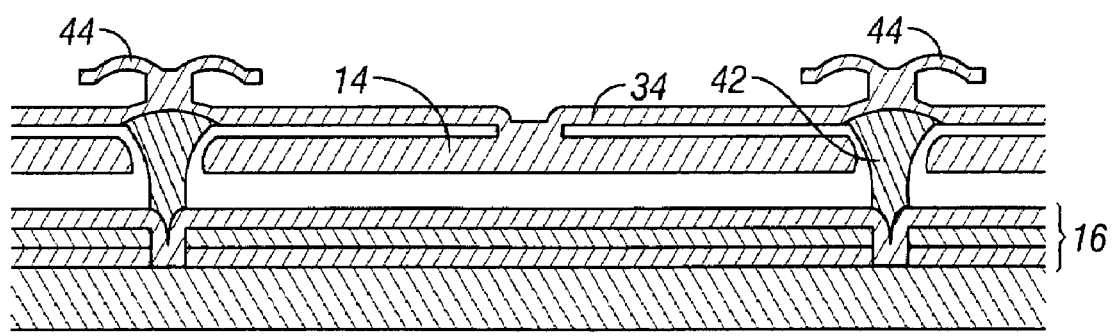
FIG. 7E is a cross section of an additional alternative embodiment of an interferometric modulator.

The details of the structure of interferometric modulators that operate in accordance with the principles set forth above may vary widely. For example, FIGS. 7A-7E illustrate five different embodiments of the movable reflective layer 14 and its supporting structures. FIG. 7A is a cross section of the embodiment of FIG. 1, where a strip of metal material 14 is deposited on orthogonally extending supports 18. In FIG. 7B, the moveable reflective layer 14 is attached to supports at the corners only, on tethers 32. In FIG. 7C, the moveable reflective layer 14 is suspended from a deformable layer 34, which may comprise a flexible metal. The deformable layer 34 connects, directly or indirectly, to the substrate 20 around the perimeter of the deformable layer 34. These connections are herein referred to as support posts. The embodiment illustrated in FIG. 7D has support post plugs 42 upon which the deformable layer 34 rests. The movable reflective layer 14 remains suspended over the gap, as in FIGS. 7A-7C, but the deformable layer 34 does not form the support posts by filling holes between the deformable layer 34 and the optical stack 16. Rather, the support posts are formed of a planarization material, which is used to form support post plugs 42. The embodiment illustrated in FIG. 7E is based on the embodiment shown in FIG. 7D, but may also be adapted to work with any of the embodiments illustrated in FIGS. 7A-7C, as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIG. 7, the interferometric modulators function as direct-view devices, in which images are viewed from the front side of the transparent substrate 20, the side opposite to that upon which the modulator is arranged. In these embodiments, the reflective layer 14 optically shields the portions of the interferometric modulator on the side of the reflective layer opposite the substrate 20, including the deformable layer 34. This allows the shielded areas to be configured and operated upon without negatively affecting the image quality. Such shielding allows the bus structure 44 in FIG. 7E, which provides the ability to separate the optical properties of the modulator from the electromechanical properties of the modulator, such as addressing and the movements that result from that addressing. This separable modulator architecture allows the structural design and materials used for the electromechanical aspects and the optical aspects of the modulator to be selected and to function independently of each other. Moreover, the embodiments shown in FIGS. 7C-7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

The amount of voltage applied by a control system that is necessary to place the movable mirror of an interferometric modulator in an actuated state is referred to as the actuation voltage. For example, as illustrated in FIG. 3, the actuation voltage is about 9-10 volts, so that the application of about −10 volts or about +10 volts actuates the movable reflective layer 14b (as illustrated in FIG. 1) of an interferometric modulator and the application of about 0 volts relaxes the movable reflective layer 14a (as illustrated in FIG. 1) of the interferometric modulator. The actuation voltage can change over time due to a number of factors including, for example, temperature, changes in the electromechanical properties of the interferometer, and physical wear of the mechanical mirror (also referred to as "aging"). It would be desirable to have a way of compensating for this actuation voltage change in order to improve the operation of the modulator.

Certain embodiments which will be described below monitor physical changes of the interferometric elements and use the monitored changes to adjust the actuation voltage. These physical changes may be indicative of one or more parameters that may affect the operation of a display array of MEMS display elements. The parameters may include, for example, temperature, changes in the electromechanical properties of the interferometer, and physical wear of the mechanical mirror. By using the monitored changes to adjust the actuation voltage, these embodiments provide a way to compensate for the change of these parameters. In the following discussion, temperature is chosen as an example to illustrate these embodiments. However, it should be noted that these embodiments may be equally used to compensate for other factors such as aging of the interferometric modulator, and are not intended to be limited to temperature compensation.

Some of these factors (e.g., changes in the electro-mechanical properties of the interferometric modulator, and physical wear of the mechanical mirror) typically affect the bias voltage only after a significant amount of use or after the passage of a certain amount of time. Temperature, however, affects characteristics of the movable reflective layer 14 in a short period of time and can cause a significant change in the voltage required to operate the interferometric modulator. Depending on the environmental conditions in which the interferometric modulator is used, for example, as incorporated in a display on a device placed on the dashboard of an automobile in Arizona during the summer, or in a device exposed to sub-zero winter temperatures, a significant temperature change can occur within hours or even minutes. By sensing a temperature existing at a location in such a device and using predetermined information that correlates the sensed temperature to the necessary voltage required to operate the interferometric modulators at that temperature, the display can be efficiently driven to operate over a wide range of temperatures by adjusting the bias and/or drive voltages as a function of the temperature.

Figure 8:
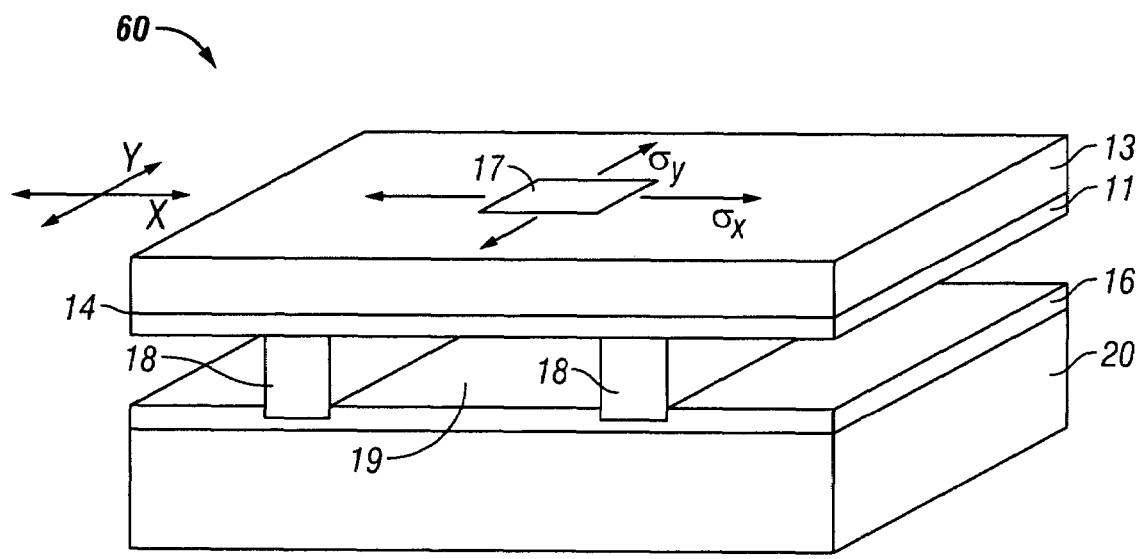
FIG. 8 is a perspective illustration of one embodiment of an interferometric modulator 60 in a released (or relaxed) state.

FIG. 8 is a perspective illustration of one embodiment of an interferometric modulator 60 in a released (or relaxed) state. The interferometric modulator 60 includes an optical stack 16 that typically includes an electrode layer, an absorber layer and a dielectric layer (not shown separately) on a transparent substrate 20. The relative thickness of the substrate 20 is much greater than the thickness of the optical stack 16. For example, in some embodiments the substrate 20 is about 700 μm thick and the optical stack 16 is about 1 μm or less thick. In some embodiments, the substrate 20 is glass. Supports 18 provide support for the movable reflective layer 14 which is separated from the optical stack 16 by a cavity 19.

The movable reflective layer 14 may include a relatively thin layer of a first material 11 and a relatively thick layer of a second material 13. In the embodiment of FIG. 8, the first material 11 is aluminum disposed in a layer which is about 300 Angstroms thick, and the second material 13 is nickel disposed in a layer that is about 1000 Angstroms thick. In other embodiments, the first material 11 and the second material 13 can comprise other materials, for example, one or more aluminum alloys. The thickness of the first material 11 and the second material 13 can also be different in other embodiments. In some embodiments, the movable reflective layer 14 can be monolithic, including only a uniform single layer comprised of, for example, nickel, nickel alloy, aluminum, or an aluminum alloy. In other embodiments, the movable reflective layer 14 can include more than two layers of materials. In some embodiments, the layer of the first material 11 can be thicker than the layer of the second material 13, which can change the relationship of the dominant material for stress and strain.

The stress which is introduced in an interferometric modulator through a change in temperature of an interferometric modulator, and the resulting strain, can significantly affect the movement of the movable reflective layer 14. Stress is the force exerted per unit area by a body upon an adjoining part, and strain is the deformation or change in dimension occasioned by stress. Both the resistance to stress and the elastic limit depend on the composition of the solid. When a body is subjected to pull, it is said to be under tension, or tensile stress, and when it is being pushed, it is under compression, or compressive stress. Tensile stress is generally considered to be positive, while compressive stress is considered to be negative. As the temperature of material changes, the body expands or contracts in accordance with the coefficient of thermal expansion (CTE) of the materials from which it is made. The normal operating temperature of an interferometric modulator can be, for example, about −40° C. to +70° C. As temperature changes, the substrate 20, the first material 11 and the second material 13 of the movable the reflective layer 14 expand and contract differently in accordance with their respective CTEs. This expansion and contraction of the two different materials introduces strain in the movable reflective layer 14, which causes a corresponding change in stress in the movable reflective layer 14.

Although both the layer of the first material 11 and the layer of the second material 13 expand and contract as a function of temperature as expressed by their respective CTEs, the CTE of the thicker layer (e.g., the second material 13), dominates the amount of expansion or contraction. The amount of expansion and contraction of the substrate 20 and optical stack 16 is dominated by the expansion and contraction of the substrate 20 due to its much greater thickness. Typically, the CTE of the substrate 20 is less than the CTE of the layer of second material 13, so that the layer of second material 13 expands and contracts more than that the substrate 20 as the reference temperature changes. However, the supports 18 constrain the expansion and contraction of the movable reflective layer 14 relative to the substrate 20. Accordingly, as the temperature changes, the movable reflective layer 14 experiences a change in strain in the planar x and y direction of the movable reflective layer 14 and a corresponding change in stress ($\sigma$) occurs also in the x and y direction of the movable reflective layer 14. Stress of the movable reflective layer 14 affects its ability to move between an actuated and an unactuated position, and accordingly affects the bias voltage. In one embodiment, the substrate 20 comprises display grade Corning 1737, an aluminosilicate glass with a CTE of $3.76 \times 10^{-6}/°$ C. A typical composition of aluminosilicate glass is 55.0% $SiO_2$, 7.0% $B_2O_3$, 10.4% $Al_2O_3$, 21.0% CaO, and 1.0% $Na_2O$.

Figure 9:
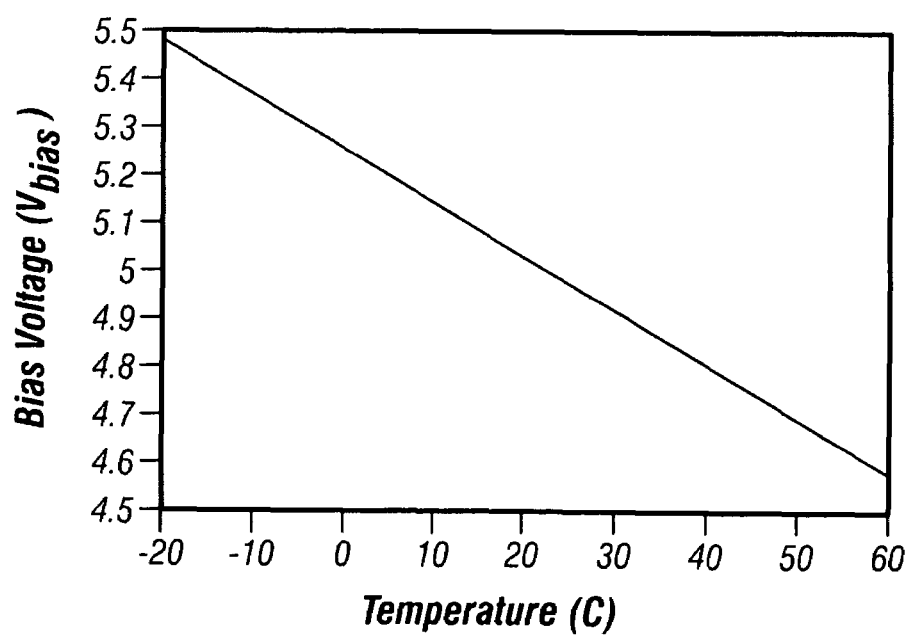
FIG. 9 is a graph illustrating the relationship between temperature (x-axis) and bias voltage (y-axis) of an interferometric modulator, according to one embodiment.

FIG. 9 is a graph illustrating the relationship between temperature (x-axis) and bias voltage (y-axis) of an interferometric modulator, according to one embodiment. As shown in FIG. 9, the bias voltage of an interferometric modulator over a certain temperature range is approximately inversely related to the temperature of the interferometric modulator, e.g., as the temperature of the interferometric modulator increases, the bias voltage decreases. Even a small change of the bias voltage (e.g., about a 0.25 volts or less, in some embodiments) can be significant to affect the interferometric modulator's operation depending on hysteresis characteristics of the interferometric modulator. In the graph of FIG. 9, bias voltage changes by about 0.25 volts during a temperature change of about 25° C.

As FIG. 9 illustrates, a change in temperature causes an increase or decrease in stress in a planar x and y direction of the movable reflective layer 14 which affects the bias voltage. Temperature based compensation of the voltage applied to control the interferometric modulator 60 can be advantageously used to keep the interferometric modulator 60 operating consistently. Typically, when the temperature of the interferometric modulator increases, a lower activation voltage is provided, and when temperature decreases, a higher activation voltage is provided.

As described above, the actuation voltage applied to an interferometric modulator is a difference between two voltages that are applied to the interferometric modulator, which may be a column voltage (e.g. $V_{bias}$) and a row voltage. In the embodiment described herein, the applied row voltages do not change from the values of either $+\Delta V$ or $-\Delta V$ (e.g., see FIG. 4). However, the voltages applied to the columns can be adjusted by the array driver 22, for example, as a function of temperature thus providing an actuation voltage that is compensated for temperature and maintaining the bias voltage near the center of the hysteresis windows.

The relationship between the bias voltage, also referred to herein as the operational voltage ($V_{opp}$), stress ($\sigma$), and temperature (T) is illustrated in the following equations:

$$V_{Opp} \propto \sqrt{\sigma} \qquad \text{Equation 1}$$

$$\sigma = \sigma_o + k\Delta T \qquad \text{Equation 2}$$

wherein $\sigma_o$ is the residual stress at, for example, a reference temperature, and k is a constant. A typical reference temperature is a room temperature of about 25 degrees Celsius. As an example of the relationship between these parameters in one embodiment, every one degree Celsius increase in temperature results in a 2 MPa change in stress in the movable reflective layer and ~11 mV shift in operational voltage. In a common embodiment, the stress ($\sigma$) within layer 14 of the interferometric modulator 60 is a tensile stress, which means that $\sigma$ is greater than or equal to zero.

The residual stress, $\sigma_o$, in layer 14 refers to the stress at a reference temperature when in a relaxed (unactuated) state, which is a result of a process used to manufacture interferometric modulator 60. Manufacturing processes influence the residual stress, $\sigma_o$, since interferometric modulator 60 is exposed to various processing temperatures and since layer 14 is initially formed on a sacrificial layer that is ultimately removed.

In FIG. 8, the stresses, $\sigma_x$ and $\sigma_y$, along the respective x and y axes, within layer 14 are shown with respect to a unit area 17. The change in actuation voltage resulting from a change in temperature of the interferometric modulator can be shown by the following equation:

$$V_{act} \propto \left(\frac{h^{3/2}}{L}\right)\sqrt{\sigma(T)*t} \quad \text{Equation 3}$$

where L is distance between the supports of an interferometric modulator, h is the air gap thickness through which the reflective layer 14 moves, σ(T) is the stress in the movable reflective layer 14 which is a function of the reference temperature T, and t is the thickness of the movable reflective layer 14. The air gap, the thickness of the movable reflective layer, and the distance between the supports are selected during the design of the interferometric modulator and thus are not subject to change once the modulator is fabricated.

The temperature dependence of the stress σ can be described as $\sigma = \sigma_0 - \sigma_T(T)$ where $\sigma_0$ is the residual stress, at a reference temperature, in the movable reflective layer 14 after fabrication, which is dominated by the CTE of the second material 13, as described above.

The thermal expansion mismatch between the moveable reflective layer 14 and substrate 20 causes a thermal strain and resulting thermal stress that is a function of the thermal expansion mismatch. For example, where the moveable reflective layer 14 is nickel and the substrate 20 is Corning Glass No. 1737, the thermal mismatch (ΔCTE) can be described as $$\Delta CTE = \alpha_1 - \alpha_2 \quad \text{Equation 4}$$

where $\alpha_1 = 13.0 \times 10^{-6}/°C$ (the CTE of Nickel), and $\alpha_2 = 3.76 \times 10^{-6}/°C$ (the CTE of Corning Glass No. 1737). The thermal strain $\in_T$ can then be described as $$\in_T = (\Delta CTE)(\Delta T) \quad \text{Equation 5}$$

wherein ΔT is the temperature change with respect to a reference temperature. The resulting thermal stress can them be described as $$\sigma_T(T) = E_1 \in_T = E_1(\Delta CTE)(\Delta T) \quad \text{Equation 6}$$

where $E_1$ is the elastic modules of nickel, and ΔT is the temperature change with respect to a reference temperature. The actuation voltage can then be described as a function of temperature as shown in either of the following equations:

$$V_{act}(T) \propto \left(\frac{h^{3/2}}{L}\right)\sqrt{((\sigma_0 - E_1(\alpha_1 - \alpha_2)\Delta T))*t} \quad \text{Equation 7}$$

or $$V_{act}(T) \cong k_1\sqrt{\sigma_0 t}\left(1 - \frac{k_2 \Delta T}{2\sigma_0}\right) \quad \text{Equation 8}$$

wherein ΔT is the temperature change with respect to a reference temperature. Equation 8 shows the actuation voltage as a linear approximation of the Equation 7. Note that $k_1$ and $k_2$ are constants that simplify the representation of the actuation voltage equation.

The residual stress of the movable reflective layer 14 is controllable to some extent during fabrication by the selection of variables that minimize the mismatch of CTEs between the movable reflective layer 14 and the substrate 20, the thickness of the layers of each material used (e.g., the first material 11 and the second material 13), and the modulator fabrication technique.

As shown in Equation 8, the actuation voltage depends on certain constants such as $k_1$ and $k_2$. However, these constants are subject to non-linear effects, such as aging, and therefore may vary in the long term. Temperature compensation devices which take these effects into account thus are preferable.

Figure 10:
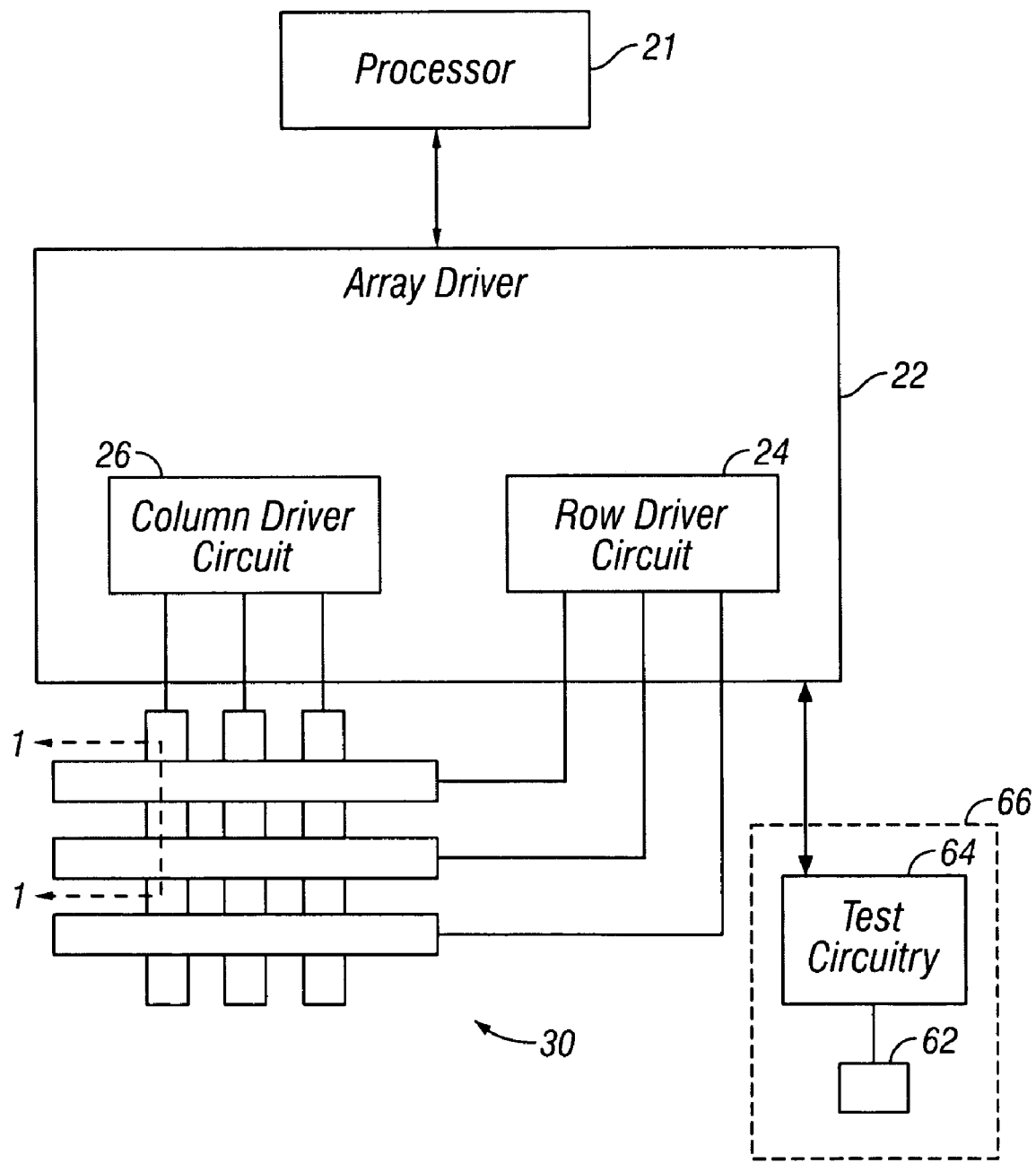
FIG. 10 is a system block diagram that schematically illustrates one embodiment of an electronic device incorporating a 3×3 interferometric modulator display, and where the driving circuit is configured to provide actuation signals to drive the array 30 based on a temperature present.

FIG. 10 is a system block diagram that schematically illustrates one embodiment of an electronic device incorporating a 3×3 interferometric modulator display, and where the driving circuit is configured to provide actuation signals to drive the array 30 based on temperature. The block diagram of FIG. 10 illustrates a temperature sensing circuit 66 coupled to the array driver circuit. The sensor 66 senses a temperature dependent parameter and provides a signal to the array driver 22 that is based on the temperature. The sensor 66 may include various embodiments of sensor circuitry, for example, circuitry that senses temperature and generates a corresponding signal, or circuitry that is influenced by temperature so that signals from the sensor correspond to the temperature. For example, the sensor 66 may include a thermistor (not shown) whose resistance changes with temperature. Because of the known dependence of resistance on temperature, the resistor can be used as a temperature sensor. In some embodiments, the sensor 66 comprises a thermocouple. These devices have drawbacks, however, because while they may provide a temperature dependent output that can be used to adjust the array driver outputs based on the above linear relationship, the devices do not react to aging or environmental stresses in the same way that the display elements do. Thus, the temperature dependence of the display elements could change over time, which is not taken into account at all by a thermocouple or thermistor based system.

In one embodiment of the invention, the sensor 66 comprises a test deflecting structure 62 having a construction similar to a display element of the display array 30. The sensor 66 is configured to monitor directly physical changes of the MEMS display element, e.g., deflection, such that the array driver 22 can use the knowledge of these changes to adjust driving signals to compensate for temperature change. This type of temperature dependent device can be expected to react similarly to aging and other stresses as the display elements themselves. It can therefore be expected to allow more accurate driver compensation than thermocouples or thermistors.

In the exemplary embodiment, the test deflecting structure 62 forms a variable capacitor with temperature dependent capacitance. The test circuitry 64 monitors the deflection by monitoring the capacitance of the test deflecting structure 62 and generates a signal dependent on the temperature. In some embodiments, the deflection may also be monitored by other methods such as an optical mechanism. The test circuitry 64 may use various techniques, such as an AC capacitance bridge or vibrating integrating electrometer, to monitor the capacitance. One embodiment incorporating an AC capacitance bridge will be described in detail later in FIGS. 12A and 12B.

The test deflecting structure 62 may be located in various places, depending on the particular implementation desired. The location of the test deflecting structure 62 is preferably determined such that the temperature under which the test deflecting structure 62 operates has a pre-determined relationship to the temperature under which the interferometric modulators of the array 30 operate. In one embodiment, the test deflecting structure 62 is located on the perimeter of the display array 30.

Though the display array 30 comprises interferometric modulators in the exemplary embodiment, it may comprise other forms of MEMS display elements instead. In that case, the test deflecting structure 62 has a construction similar to whatever MEMS display elements structure is being utilized in the display.

Figure 11:
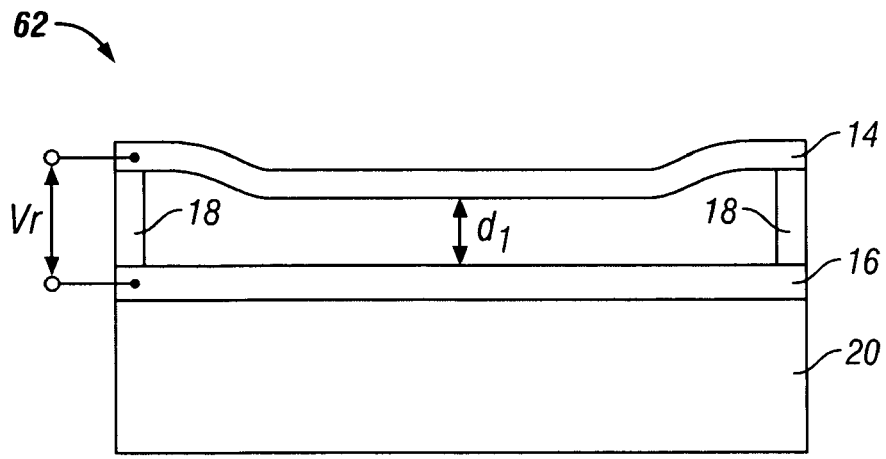
FIG. 11 illustrates one embodiment of a test deflecting structure 62 in FIG. 10.

FIG. 11 illustrates one embodiment of a test deflecting structure 62 in FIG. 10. In the exemplary embodiment, the test deflecting structure 62 has a construction similar to an interferometric modulator of the display array 30. The test deflecting structure 62 comprises a test deflecting element 14, which is similar to the movable reflective layer 14 in FIG. 8. The test deflecting structure 62 may further comprise supports 18 and a substrate 20. In some embodiments, the substrate 20 further comprises an optical stack 16 on the top of the substrate 20, but the optically active part of the stack (e.g. the chromium described above) is not necessary if the optical properties of the structure are not being utilized.

In one embodiment, the test deflecting element 14 comprises the same material that is used to make the movable reflective layer 14 of the interferometric modulators of the array 30. In one embodiment, the test deflecting element 14 is fabricated by the same process used to fabricate the movable reflective layer of the interferometric modulators of the array 30. The test deflecting element and the movable reflective layer of the interferometric modulators may be manufactured either concurrently or sequentially. The test deflecting element may or may not be fabricated on the same substrate as the interferometric modulators.

In certain embodiments, a voltage with a substantially constant DC component is applied to the test deflecting structure 62. The substantially constant DC component is chosen such that the test deflecting structure 62 stays unactuated. In some embodiments, the DC component is the bias voltage applied at the nominal reference temperature (e.g. normal room temperature). In some embodiments, the substantially constant voltage is a DC-biased AC signal such as a DC-biased square wave. The amplitude of the AC component may be relatively small in comparison to the amplitude of the DC component. For example, the amplitude of the AC component may be 5% or less of the DC component. The period of the AC component can be much higher than the mechanical response time of the structure 62, and if this is the case, the amplitude need not necessarily be small. Generally, the DC component of the applied voltage deforms the membrane an amount that depends on temperature, and the AC component produces an AC current through the device that can be used to determine the capacitance.

Using a test deflecting structure similar to the display element offers several benefits. First, since the deflection can be monitored continuously, or nearly continuously, it provides a continuous or near continuous measurement of the temperature. Second, deflection of a test deflecting structure is subject to similar non-linear effects, such as aging, as deflection of the display element since they have similar structures. Therefore, using a test deflecting structure may further offer compensation for impact of these non-linear effects on the display element, in addition to temperature. On the other hand, a sensor having a different structure (such as a thermistor) is subject to different non-linear effects from the display element. These non-linear effects may affect the accuracy of the temperature compensation.

In certain embodiments, the test deflecting structure is driven substantially at the same time and in the same way as display elements are driven by driving signals, such that aging occurs to the test deflecting structure in the same way as it does to display elements. The test deflecting structure is not driven by these driving signals used to drive display elements when deflection measurement is taken.

In the embodiment illustrated in FIG. 10, the array driver 22 is configured to use the signal it receives from the sensor 66 to provide signals to drive the array 30 that correspond to the temperature. In one embodiment, the array driver 22 uses a pre-determined look-up table stored in memory to determine the appropriate voltages to provide to the array based on the received temperature-based signal. In another embodiment, circuitry in the array driver 22 (or the processor 21) can approximate the curve illustrated in FIG. 9 (for example, approximate the relationship between temperature and operational voltage as linear) and then provide signals to the array 30 that are proportional to the received temperature-based signal using the defined relationship between temperature and operational voltage.

In the exemplary embodiment, the test deflecting structure 62 has a similar structural configuration as an interferometric modulator found in array 30. Usually, such test deflecting structure is not used to output light for display purposes. The overall dimensional scale of the test deflecting structure may be similar to or different than that of interferometric modulators within array 30. The overall or specific dimensions of the test deflecting structure may be varied with respect to the interferometric modulators of array 30 depending upon the intended test measurement objectives. In some embodiments, the test deflecting structure 62 is made in a larger scale than the interferometric modulators of the array 30 in order to increase sensitivity of the capacitance change to the temperature shift. In alternative embodiments, the test deflecting structure 62 has different structural configurations from those of array 30. In some embodiments, the test deflecting structure 62 and the interferometric modulators of the array 30 have, respectively, a first and second deflection function of temperature, wherein the first and second functions have a predetermined relationship with each other.

When a constant voltage $V_r$ is applied between the test deflecting element 14 and the optical stack 16 (or the substrate 20), the capacitor formed between the test deflecting element 14 and the optical stack 16 becomes charged. The electrostatic forces cause the test reflecting element 14 to move toward the optical stack 16. The distance $d_1$ between the test deflecting element 14 and the optical stack 16 depends on the flexibility of the test deflecting element 14 when the voltage is constant. In some embodiments, the constant voltage $V_r$ is selected such that the test deflecting element 14 is deformed downward but not actuated during the operation. In some embodiment, the constant voltage $V_r$ is selected to be one of the fixed reference voltages used to driver the modulator.

As discussed above, as temperature changes, the stress in the test reflecting element 14 changes. When temperature rises, the test reflecting element 14 becomes more flexible and thus the distance $d_1$ decreases due to voltage $V_r$. The capacitance of the element then increases. When temperature decreases, the capacitance of the capacitor decreases. Therefore, the test deflecting structure 62 forms a variable capacitor with temperature dependent capacitance. By monitoring the capacitance change, the test circuitry 64 (see FIG. 10) generates a signal indicative of the temperature.

Figure 12A:
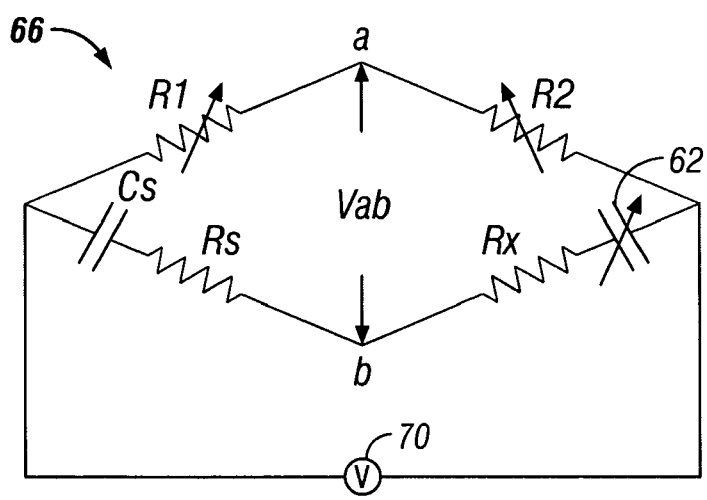
FIG. 12A is a functional block diagram illustrating one embodiment of the sensor 66 in FIG. 10.

FIG. 12A is a functional block diagram illustrating one embodiment of the sensor 66 in FIG. 10. A voltage source 70 applies a pre-determined AC voltage signal to a capacitance bridge. The capacitance bridge comprises two variable resistors $R_1$ and $R_2$, a fixed capacitor $C_s$, and a variable capacitor $C_x$ formed by the test deflecting structure 62. In some embodiments, the capacitance bridge may further comprise two fixed resistors $R_s$ and $R_x$. To measure the capacitance of the test reflecting structure 62, the resistance of the variable resistors $R_1$ and $R_2$ is adjusted to balance the bridge, and render $V_{ab}=0$. When the bridge is balanced, the capacitance of the test deflecting structure 62 can be calculated as follows:

$$Cx = Cs * R1/R2 \qquad \text{Equation 9}$$

The capacitance of the test deflecting structure 62 is then sent to the array driver 22 as a signal indicative of the temperature.

To determine whether the bridge is balanced, the voltage potential difference $V_{ab}$ between the point a and point b is monitored. The bridge is balanced when $V_{ab}$ is below a pre-determined threshold value substantially close to 0. In some embodiments, a current sensor is connected between the point a and b. The bridge is balanced when the current is below a pre-determined threshold value.

In some embodiments, the sensor 66 comprises a controller configured to control the operation of the sensor. For example, the controller may be configured to measure $V_{ab}$ and determine whether the bridge is balanced, adjust the resistance of the variable resistors $R_1$ and $R_2$ to balance the bridge, determine the resistance of the variable resistors $R_1$ and $R_2$ when the bridge is balanced, calculate the capacitance of the variable capacitor 62, and send a signal to the array driver 22 based on the sensed capacitance. The controller may be any electronic device suitable for controlling the circuit operation. In other embodiments, the test circuitry 64 does not comprise a controller. In that case, the array driver 22 or the processor 21 (see FIG. 10) may be configured to control the operation of the test circuitry 64.

The test circuitry 64 may be located in various places, depending on the particular implementation desired. The test circuitry 64 may or may not be near the test deflecting element 62. In one embodiment, the test circuitry 64 is located in the array driver 22 or the processor 21 (see FIG. 10).

Figure 12B:
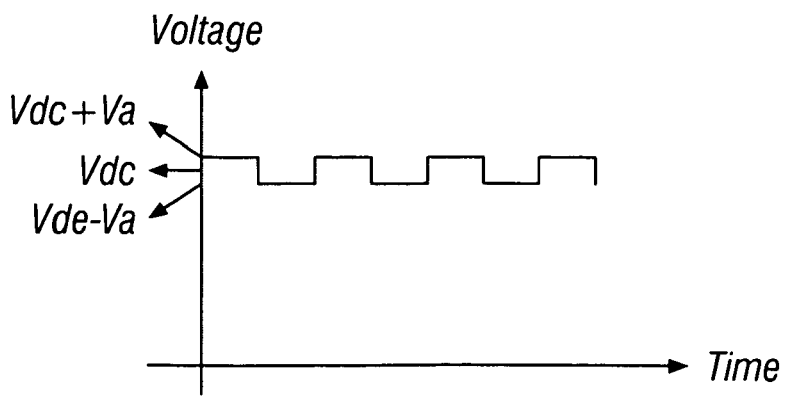
FIG. 12B illustrates an example of a voltage signal that may be applied by the voltage source 70 in FIG. 12A.

FIG. 12B illustrates an example of a voltage signal that may be applied by the voltage source 70 in FIG. 12A. The vertical axis represents the voltage of the signal while the horizontal axis represents the time. The voltage signal is a DC biased square wave with its maximum value at $V_{dc}+V_a$ and its minimum value at $V_{dc}-V_a$. The DC bias voltage $V_{dc}$ is a constant voltage value chosen such that the variable capacitor 62 is subject to a voltage close to the reference voltage $V_r$. As discussed with regard to FIG. 11, $V_r$ is a pre-determined reference voltage which deforms but does not actuate the test deflecting structure 62. The amplitude of the AC component may be relatively small in comparison to the DC component. In some embodiments, $V_{dc}$ and $V_a$ are respectively 10 volts and 0.1 volts.

In another embodiment, the sensor 66 comprises a feedback loop (not shown) to keep the capacitance of the variable capacitor 62 constant when temperature changes. A variable offset value $V_{offset}$ is added to the voltage signal in FIG. 12B and the resulting voltage signal is applied to the variable capacitor 62. At a reference temperature $T_0$, $V_{offset}$ is set to 0. The resistance of the resistors $R_1$ and $R_2$ is adjusted such that the bridge is balanced (i.e. $V_{ab}=0$). When temperature changes, a feedback loop adjusts $V_{offset}$ based on the measured value of $V_{ab}$ until the bridge is balanced. The sensor 66 then sends the value of the offset voltage $V_{offset}$ or the total voltage $V_{dc}+V_{offset}$ to the array driver 22 as a signal indicative of the temperature. In that case, the array driver 22 may adjust the driving voltage based on the offset voltage directly without requiring calculating temperature. In case the test deflecting structure 62 has the same structure as the interferometric modulators of the array 30, the array driver 22 may simply generate the driving voltage at any temperature by adding the measured offset voltage to the driving voltages configured to work at the reference temperature. As discussed above, the operation of the sensor 66 may be controlled by a controller inside the sensor, by the processor 21, or by the array driver 22.

Figure 13:
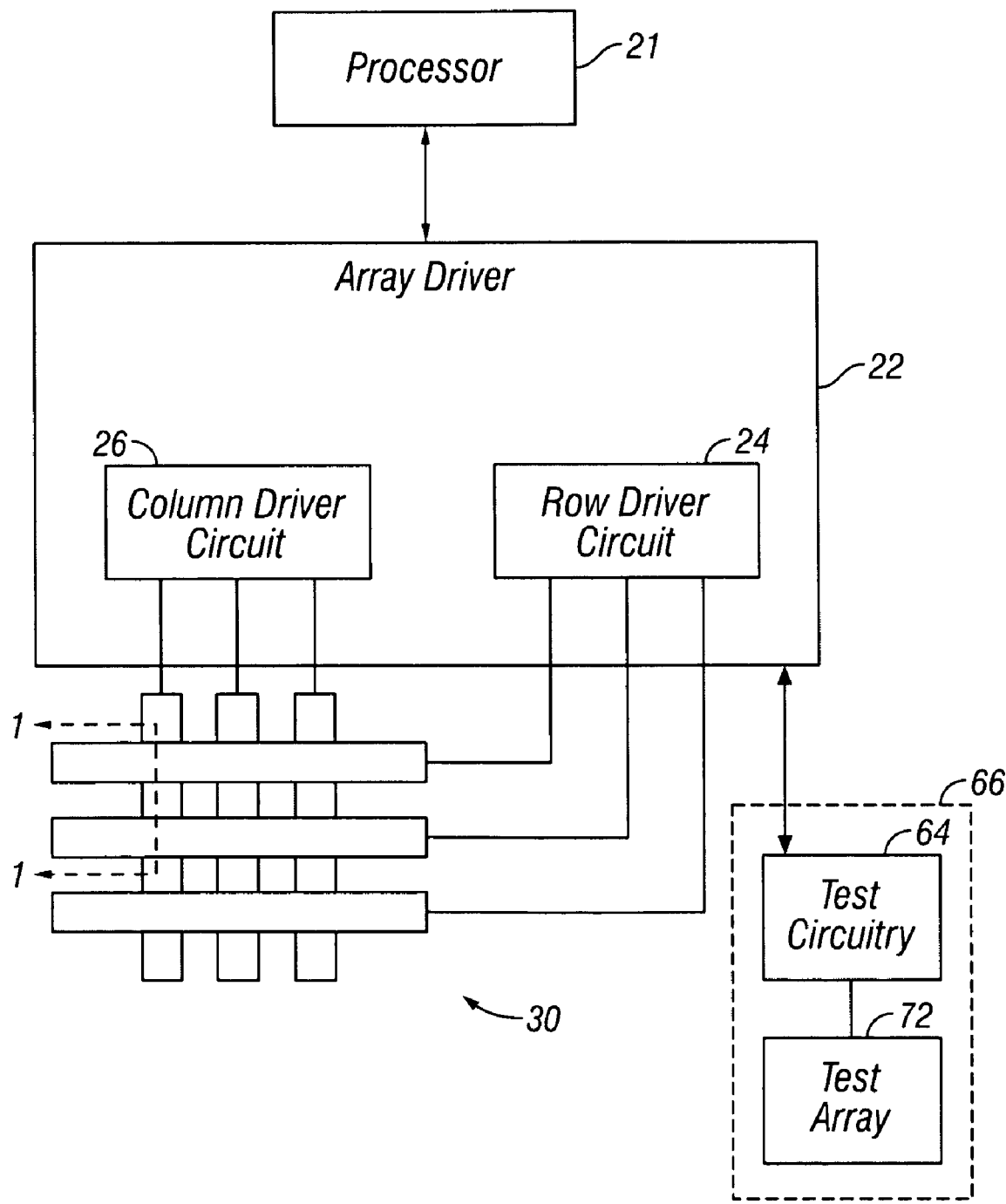
FIG. 13 is a system block diagram that schematically illustrates another embodiment of an electronic device incorporating a 3×3 interferometric modulator display, similar to that depicted in FIG. 10, but including an array of test deflecting structures 72 (or test array) rather than a test deflecting structure 62.

FIG. 13 is a system block diagram that schematically illustrates another embodiment of an electronic device incorporating a 3×3 interferometric modulator display, similar to that depicted in FIG. 10, but including an array of test deflecting structures 72 (or test array) rather than a single test deflecting structure 62. The test array 72 comprises two or more test deflecting structures 62 similar to that depicted in FIG. 11, with each test deflecting structure 62 being connected in parallel. The test array 72 thus forms a variable capacitor whose capacitance is the sum of capacitance of capacitors each formed by one test deflecting structure 62. The test circuitry 64 now works the same way as depicted in FIGS. 12A and 12B except that the variable capacitor formed by the test deflecting structure 62 is now replaced by the variable capacitor formed by the test array 72. In some embodiments, the test array 72 is relatively small in comparison to the array 30. The test array could comprise, for example, a 10×10 array of test deflecting structures 62 with rows shorted to each other and columns shorted to each other.

In a sensor 66 which comprises one test deflecting structure 62, it is possible that the capacitance of the variable capacitor 62 is so small as to be swamped by noise during measurement and potentially obscured by stray capacitance. Making the test deflecting structure 62 in larger scale than the interferometric modulators of the array 30 would offer limited increase of the sensitivity to temperature shift. Also, the sensor 66 will totally stop functioning if the one test deflecting structure 62 fails. The exemplary embodiment as illustrated in FIG. 13 addresses these two problems by connecting, for example, 100 variable capacitors formed by test deflecting structures 62 in parallel. The sensitivity is increased by, for example, about 100 times. The sensor 66 will still work well even if any one or more test deflecting structures of the test array fail.

Figure 14:
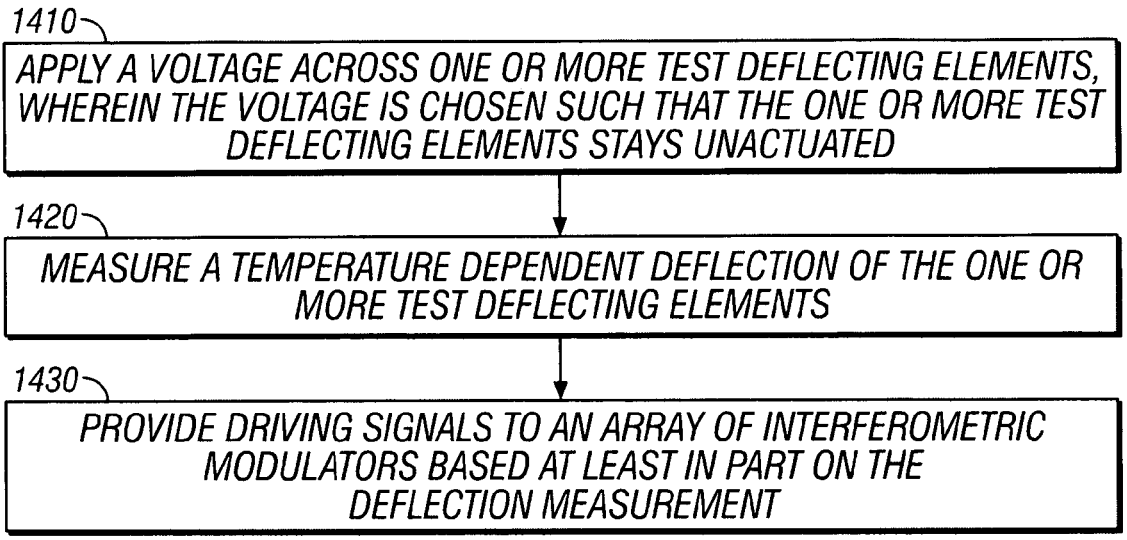
FIG. 14 is a flowchart illustrating one embodiment of a method of driving an array of interferometric modulators in a display as illustrated in FIG. 10.

FIG. 14 is a flowchart illustrating one embodiment of a method of driving an array of interferometric modulators in a display as illustrated in FIG. 10. Depending on the embodiment, certain steps of the method may be removed, merged together, or rearranged in order. The steps below may be either performed by the sensor 66, the array driver 22, or the processor 21 (see FIG. 10).

The method 1400 starts at a block 1410, where a voltage is applied across one or more test deflecting elements 14. The voltage is chosen such that the one or more test deflecting elements 14 stays unactuated. In some embodiments, the voltage is a constant voltage such as a fixed reference voltage applied to drive the array 30. In some embodiments, the voltage is substantially constant. In one embodiment, the voltage is a DC-biased AC signal such as a DC-biased square wave. The amplitude of the AC component may be relatively small in comparison to the amplitude of the DC component. For example, the amplitude of the AC component may be 5% or less of one of the DC component.

Next at a block 1420, a temperature dependent deflection of the one or more test deflecting elements 14 is measured. In some embodiments, the deflection is measured by measuring the capacitance between the one or more test deflecting elements 14 and the substrate 20. Moving to a block 1430, driving signals are provided to an array of interferometric modulators 30 based at least in part on the deflection measurement.

Figure 15:
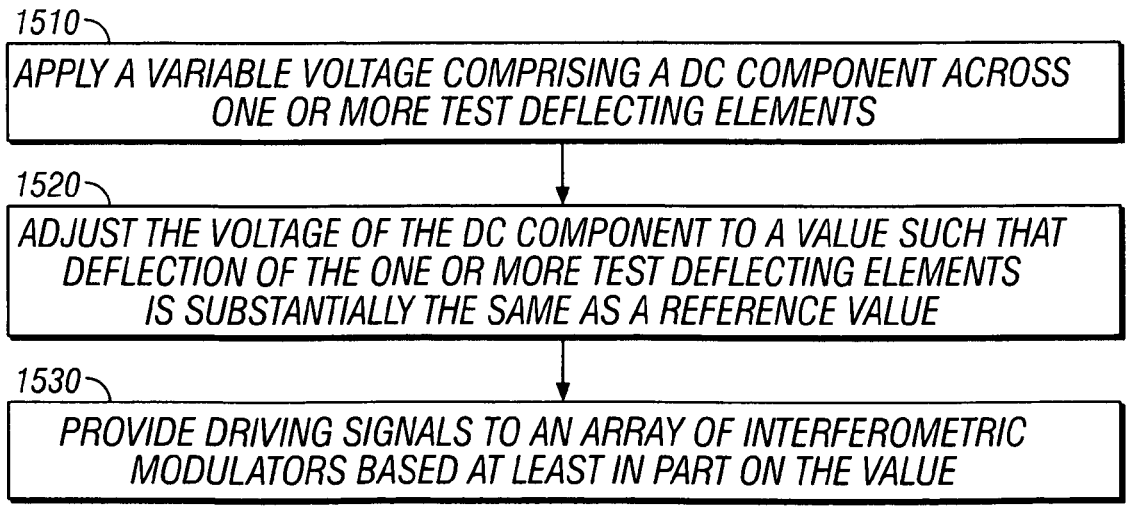
FIG. 15 is a flowchart illustrating another embodiment of a method of driving an array of interferometric modulators in a display as illustrated in FIG. 10.

FIG. 15 is a flowchart illustrating another embodiment of a method of driving an array of interferometric modulators in a display as illustrated in FIG. 10. Depending on the embodiment, certain steps of the method may be removed, merged together, or rearranged in order. The steps below may be either performed by the sensor 66, the array driver 22, or the processor 21 (see FIG. 10).

The method 1500 starts at a block 1510, where a variable voltage comprising a DC component is applied across one or more test deflecting elements 14. The variable voltage is chosen such that the one or more test deflecting elements 14 stays unactuated. In some embodiments, the variable voltage may be a DC signal with variable amplitude such as a fixed reference voltage applied to drive the array 30. In some embodiments, the variable voltage is a DC-biased AC signal such as a DC-biased square wave. The amplitude of the AC component is relatively small in comparison to the amplitude of the DC component. For example, the amplitude of the AC component may be 5% or less of one of the DC component.

Next at a block 1520, the voltage of the DC component is adjusted to a value, based on deflection of the one or more test deflecting elements 14, such that the sensed deflection is substantially the same as a reference value. The reference value is the deflection measured when the one or more test deflecting elements is at a reference temperature. In some embodiments, the voltage of the DC component is adjusted by a feedback loop from a signal indicative of the deflection of the one or more test deflecting elements 14. The one or more deflecting element stays unactuated during the operation. In some embodiments, the deflection is measured by measuring the capacitance between the one or more test deflecting elements 14 and electrodes on the substrate 20. Moving to a block 1530, driving signals are provided to an array of interferometric modulators 30 based at least in part on the value of the voltage of the DC component. In some embodiments, driving signals are provided based on the value without requiring calculation of the temperature.

The foregoing description details certain embodiments of the invention. It will be appreciated, however, that no matter how detailed the foregoing appears in text, the invention can be practiced in many ways. It should be noted that the use of particular terminology when describing certain features or aspects of the invention should not be taken to imply that the terminology is being re-defined herein to be restricted to including any specific characteristics of the features or aspects of the invention with which that terminology is associated.

What is claimed is:

1. A display device, comprising:
   an array of MEMS display elements;
   at least one test deflecting element;
   a deflection sensing circuit connected to the test deflecting element, the deflection sensing circuit being configured to monitor deflection of the test deflecting element without actuating the test deflection element and to provide a signal indicative of one or more parameters affecting operation of the array of MEMS display elements based on the deflection; and
   a driving circuit connected to the array of MEMS display elements and the deflection sensing circuit, the driving circuit being configured to drive the array of MEMS display elements based at least in part on the signal communicated from the deflection sensing circuit.

2. The device of claim 1, wherein the deflection sensing circuit is located in the driving circuit.

3. The device of claim 1, wherein each MEMS display element comprises an interferometric modulator, the interferometric modulator comprising an electrode layer, a deflecting element, and a gap defined by the electrode layer and the deflecting element, wherein the deflecting element moves within the gap in response to a voltage applied between the deflecting element and the electrode layer.

4. The device of claim 1, wherein deflection of the test deflecting element is a function of one or more parameters affecting operation of the array of MEMS display elements.

5. The device of claim 1, wherein the signal indicative of one or more parameters affecting operation of the array of MEMS display elements comprises a signal indicative of deflection of the test deflecting element.

6. The device of claim 1, wherein the test deflecting element is formed on a substrate.

7. The device of claim 6, wherein the deflection sensing circuit is configured to monitor deflection of the test deflecting element by monitoring the capacitance between the test deflecting element and the substrate.

8. The device of claim 6, wherein the deflection sensing circuit is configured to apply a substantially constant voltage between the test deflecting element and the substrate.

9. The device of claim 6, wherein the deflection sensing circuit is configured to adjust the voltage applied between the test deflecting element and the substrate to a first voltage such that deflection of the test deflecting element is substantially the same as a reference value.

10. The device of claim 9, wherein the signal indicative of one or more parameters affecting operation of the array of MEMS display elements comprises the first voltage.

11. The device of claim 9, wherein deflection of the test deflecting element is at the reference value when a reference voltage is applied between the test deflecting element and the substrate and the test deflecting element is at a reference temperature.

12. The device of claim 3, wherein the test deflecting element and the deflecting element of the array of interferometric modulators have, respectively, a first and a second electromechanical response, wherein the first and second electromechanical responses have a predetermined relationship with each other.

13. The device of claim 12, wherein the first and second electromechanical response each is a function of temperature.

14. The device of claim 3, wherein the test deflecting element and the deflecting element of the array of interferometric modulators are substantially the same.

15. The device of claim 3, wherein the scale of the test deflecting element is substantially larger than of the deflecting element of the array of interferometric modulators.

16. The device of claim 3, wherein the test deflecting element and the deflecting element of the array of interferometric modulators are made of substantially the same material.

17. The device of claim 3, wherein the test deflecting element and the deflecting element of the array of interferometric modulators are formed by substantially the same process.

18. The device of claim 3, wherein the test deflecting element and the deflecting element of the array of interferometric modulators are formed substantially at the same time.

19. The device of claim 1, wherein the test deflecting element and the array of interferometric modulators are formed on a common substrate.

20. The device of claim 1, wherein the deflection sensing circuit is configured to monitor deflection substantially continuously.

21. The device of claim 1, further comprising:
    a display;
    a processor that is configured to communicate with said display, said processor being configured to process image data; and
    a memory device that is configured to communicate with said processor.

22. The device of claim 21, further comprising a driver circuit configured to send at least one signal to the display.

23. The device of claim 22, further comprising a controller configured to send at least a portion of the image data to the driver circuit.

24. The device of claim 21, further comprising an image source module configured to send said image data to said processor.

25. The device of claim 24, wherein the image source module comprises at least one of a receiver, transceiver, and transmitter.

26. The device of claim 21, further comprising an input device configured to receive input data and to communicate said input data to said processor.

27. The device of claim 1, wherein one or more parameters affecting operation of the array of MEMS display elements comprise temperature.

28. The device of claim 1, wherein one or more parameters affecting operation of the array of MEMS display elements comprise aging.

29. A display device, comprising:
an array of MEMS display elements;
an array of test deflecting elements formed on a substrate, each test deflecting element being connected in parallel; and
a deflection sensing circuit connected to the array of test deflecting elements, the deflection sensing circuit being configured to monitor capacitance of the array of test deflecting elements and to provide a signal indicative of one or more parameters affecting operation of the array of MEMS display elements based on the capacitance; and
a driving circuit connected to the array of MEMS display elements and the deflection sensing circuit, the driving circuit being configured to drive the array of MEMS display elements based at least in part on the signal communicated from the deflection sensing circuit.

30. The device of claim 29, wherein each MEMS display element comprises an interferometric modulator, the interferometric modulator comprising an electrode layer, a deflecting element, and a gap defined by the electrode layer and the deflecting element, wherein the deflecting element moves within the gap in response to a voltage applied between the deflecting element and the electrode layer.

31. The device of claim 29, wherein deflection of each test deflecting element is a function of one or more parameters affecting operation of the array of MEMS display elements.

32. The device of claim 29, wherein the signal indicative of one or more parameters affecting operation of the array of MEMS display elements comprises a signal indicative of the capacitance.

33. The device of claim 29, wherein the deflection sensing circuit is configured to apply a common and substantially constant voltage between each test deflecting element and the substrate.

34. The device of claim 33, wherein the deflection sensing circuit is configured to adjust the common voltage applied between each test deflecting element and the substrate to a first voltage such that deflection of each test deflecting element is substantially the same as a reference value.

35. The device of claim 34, wherein the signal indicative of one or more parameters affecting operation of the array of MEMS display elements comprises the first voltage.

36. The device of claim 34, wherein deflection of each test deflecting element is at the reference value when a reference voltage is applied between the test deflecting element and the substrate and the test deflecting element is at a reference temperature.

37. The device of claim 30, wherein each test deflecting element and the deflecting element of the array of interferometric modulators have, respectively, a first and a second electromechanical response, wherein the first and second electromechanical responses have a predetermined relationship with each other.

38. The device of claim 37, wherein the first and second electromechanical response each is a function of temperature.

39. The device of claim 30, wherein each test deflecting element and the deflecting element of the array of interferometric modulators are substantially the same.

40. The device of claim 30, wherein each test deflecting element and the deflecting element of the array of interferometric modulators are made of substantially the same material.

41. The device of claim 30, wherein the array of test deflecting elements and the deflecting element of the array of interferometric modulators are formed by substantially the same process.

42. The device of claim 30, wherein the array of test deflecting elements and the deflecting element of the array of interferometric modulators are formed substantially at the same time.

43. The device of claim 29, wherein the array of test deflecting elements and the array of interferometric modulators are formed on a common substrate.

44. The device of claim 29, further comprising a driving circuit connected to the array of MEMS display elements and the deflection sensing circuit, the driving circuit being configured to provide signals to drive the array of MEMS display elements based on the signal communicated from the deflection sensing circuit.

45. The device of claim 29, wherein the deflection sensing circuit is configured to keep each test deflection element from being actuated.

46. The device of claim 29, wherein the one or more parameters affecting operation of the array of MEMS display elements comprise temperature.

47. The device of claim 29, wherein the one or more parameters affecting operation of the array of MEMS display elements comprise aging.

48. A method of driving an array of interferometric modulators, the method comprising:
applying a voltage across one or more test deflecting elements, wherein the voltage is chosen such that the one or more test deflecting elements stays unactuated;
measuring a deflection of the one or more test deflecting elements; and
providing driving signals to an array of interferometric modulators based at least in part on the deflection measurement.

49. The method of claim 48, wherein measuring deflection comprises measuring the capacitance between the one or more test deflecting elements and the substrate.

50. The method of claim 48, wherein the voltage is substantially constant.

51. The method of claim 48, wherein the deflection is function of one or more parameters affecting operation of the array of interferometric modulators.

52. The method of claim 51, wherein the one or more parameters comprise temperature.

53. The method of claim 51, wherein the one or more parameters comprise aging.

54. A method of driving an array of interferometric modulators, the method comprising:

applying a variable voltage across one or more test deflecting elements, the variable voltage comprising a DC component;

adjusting the voltage of the DC component to a value such that deflection of the one or more test deflecting elements is substantially the same as a reference value, wherein the one or more test deflecting elements stays unactuated; and providing driving signals to an array of interferometric modulators based at least in part on the value.

55. The method of claim 54, wherein measuring deflection comprises measuring the capacitance between the one or more test deflecting elements and the substrate.

56. A display device, comprising:

means for displaying image data;

at least one test deflecting element being different from the displaying means; and means for monitoring deflection of the test deflecting element, the deflecting monitoring means being configured to monitor deflection of the test deflection element without actuating the test deflection element and to provide a signal indicative of one or more parameters affecting operation of the displaying means based on the deflection; and means for driving the displaying means based on the signal.

57. The device of claim 56, wherein the displaying means comprises an array of interferometric modulators.

58. The device of claim 56, wherein the one or more parameters comprise temperature.

59. The device of claim 56, wherein the one or more parameters comprise aging.

* * * * *